US008837530B2

(12) United States Patent
Agrawala et al.

(10) Patent No.: US 8,837,530 B2
(45) Date of Patent: Sep. 16, 2014

(54) METHOD AND SYSTEM FOR ADAPTIVE SYNCHRONIZATION OF TIMING INFORMATION GENERATED BY INDEPENDENTLY CLOCKED COMMUNICATION NODES

(75) Inventors: Ashok K. Agrawala, Ashton, MD (US); Matthew Mah, Washington, DC (US)

(73) Assignee: University of Maryland, College Park, MD (US)

( * ) Notice: Subject to any disclaimer, the term of this patent is extended or adjusted under 35 U.S.C. 154(b) by 495 days.

(21) Appl. No.: 13/047,790

(22) Filed: Mar. 14, 2011

(65) Prior Publication Data

US 2011/0268097 A1 Nov. 3, 2011

Related U.S. Application Data

(60) Provisional application No. 61/313,476, filed on Mar. 12, 2010.

(51) Int. Cl.
*H04J 3/06* (2006.01)
(52) U.S. Cl.
USPC .......................................... 370/507; 370/503

(58) Field of Classification Search
None
See application file for complete search history.

(56) References Cited

U.S. PATENT DOCUMENTS 7,453,910 B1 * 11/2008 Biberstein et al. ............ 370/503
7,483,450 B1 * 1/2009 Giese et al. ................... 370/507

* cited by examiner

*Primary Examiner* — Jay P Patel
(74) *Attorney, Agent, or Firm* — Rosenberg, Klein & Lee

(57) ABSTRACT

A system and method are provided for adaptive synchronization of timing information provided in communications messages transmitted between independently clocked communication nodes of a wireless communications network. The system and method include measures for collecting timestamps of messages generated by a plurality of the nodes, each timestamp being generated by one of the nodes relative to a local time reference thereof. A pairwise clock error is computed for at least one pair of nodes based upon a plurality of network messages passed therebetween. A global time reference is adaptively established for the timestamps responsive to the pairwise clock error. A plurality of mapping factors are defined each for translating from one local time reference to the global time reference. The mapping factors are selectively applied to corresponding ones of the timestamps.

29 Claims, 18 Drawing Sheets

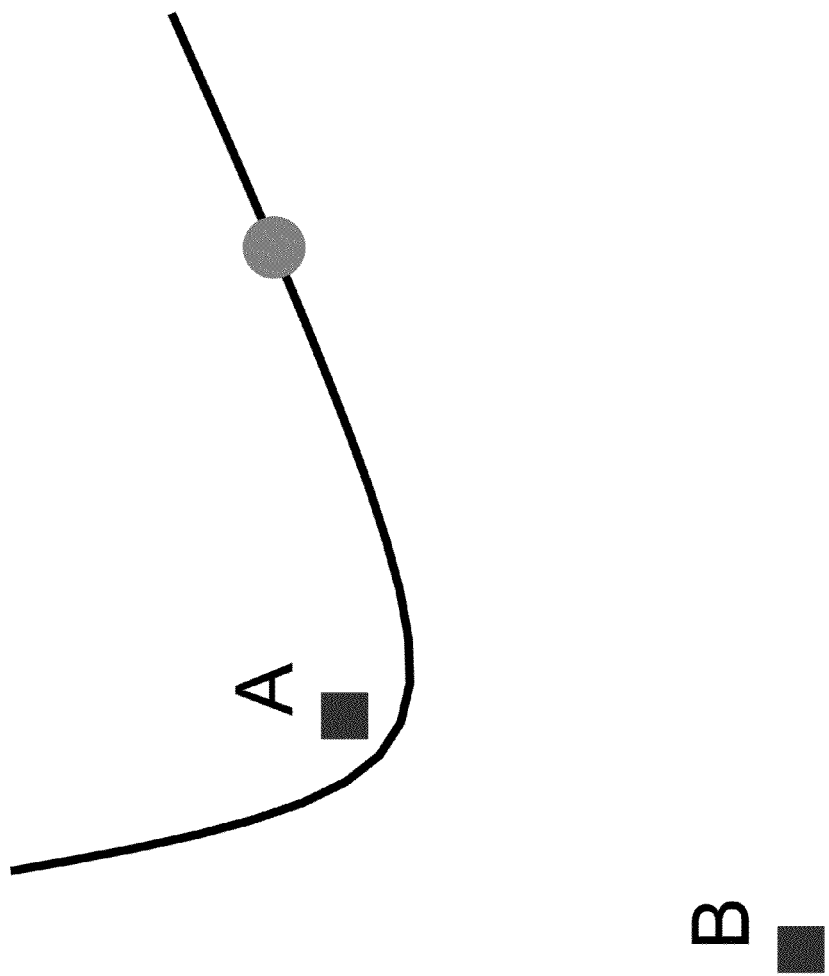

Fig. 7. Exponential filter to estimate $\frac{\beta_b}{\beta_a} - 1$

METHOD AND SYSTEM FOR ADAPTIVE SYNCHRONIZATION OF TIMING INFORMATION GENERATED BY INDEPENDENTLY CLOCKED COMMUNICATION NODES

RELATED PATENT APPLICATION DATA

This Application for Patent is based on Provisional Application Ser. No. 61/313,476, previously filed on 12 Mar. 2010.

STATEMENT REGARDING FEDERALLY SPONSORED RESEARCH

The invention described herein was developed through research funded by the U.S. Government under Contract nos. 1302-07-019S and N00173-05C-2016 awarded by the Naval Research Laboratory. The U.S. Government has certain rights to the invention.

BACKGROUND OF THE INVENTION

The subject method and system are generally directed to the virtual synchronization of timing information obtained from unsynchronized communication nodes. More specifically, the subject method and system are directed to the adaptively synchronized use of timing information provided in communications messages transmitted and received between independently clocked nodes operating in a wireless communications network.

With the widespread use of wireless communications networks, and various devices—from smart phones, electronic reading devices, and laptop computers—having readily available wi-fi capability, a wealth of very practical applications may be realized by collecting the timing information contained in network messages passed between users. The nodes of a wireless communication network which send and receive network communications comply with the network's protocol and invariably include some timing information. For example, each node typically applies a timestamp when it receives and/or when it sends a message. Such timing information is based on the node's own time reference established by its own local clock.

While the applicable communications standards may impose helpful requirements on the accuracy of the local clocks, they typically are not sufficient for many applications requiring precise timing information. Unlike more sophisticated and expensive satellite navigation systems (which are synchronized to the nanosecond level based on precise atom clocks), most computer hardware used as nodes in wireless computer networks employ far less sophisticated and much less expensive quartz crystal oscillator clocks. Conventional time synchronization techniques such as network time protocol (NTP) are not sufficiently accurate. Other known time synchronization techniques such as set forth by IEEE 1588 is not adequately implemented and tends to be expensive because they require hardware support.

As a result, it is very difficult to make concerted use of timing information obtained from different nodes. System-wide use of timestamping data collected from the various nodes of a communications network cannot be made without some corrective measures to account for the nodes' disparate frames of time reference. Complicating the problem is the nonlinear behavior exhibited by local clocks used in prevalent node network cards. For the example of the widely used wireless devices complying with the IEEE 802.11 standard typically exhibit clock drifts which very significantly enough to preclude use of a standard linear line of least squares approach to fit modeling clock behavior.

If sufficient synchronization of a communication nodes' timing information could be attained, it would find highly useful application in positioning/location finding systems. Currently known wireless location systems are generally based on three separate sources of information: angle of arrival, signal strength, and time. Angle of arrival measurements, while allowing the location of nonparticipants (not participating in the given system's location protocol), require expensive antenna arrays. Signal strength based location systems require signal strength measurements at the receiver being located, which precludes their use to locate nonparticipants.

In contrast, time-based wireless location systems are based on the simple equation:

$$D = \text{speed of light} * t \tag{1}$$

By measuring time precisely, distance between nodes may be measured. By measuring multiple distances between anchor nodes having known locations and a mobile node with unknown location, location may be determined by solving the nonlinear optimization problem defined by applicable distance equations.

Numerous time-based location systems are known; however, no location system heretofore known provides the degree of accuracy, compatibility, and economy necessary for required for productive use in existing wireless network broadcast environments. There is therefore a need for a simple yet accurate time-based location system which:
1) provides the capability to locate nonparticipating nodes;
2) may be implemented using inexpensive, off-the-shelf hardware;
3) is communication protocol agnostic; and
4) locates nodes accurately, with error less than a few meters.

SUMMARY OF THE INVENTION

It is an object of the present invention to provide a system and method for effectively synchronizing timing information locally generated by a plurality of independently clocked nodes of a wireless network for combined use within a common frame of time reference.

It is another object of the present invention to provide a system and method for applying effectively synchronized timing of information locally generated by a plurality of independently clocked nodes of a wireless network for combined use within a common frame of time reference in a time-based location system.

These and other objects are attained in a system and method implemented in accordance with the present invention for adaptive synchronization of timing information provided in communications messages transmitted between independently clocked communication nodes of a wireless communications network. The system and method include measures for collecting timestamps of messages generated by a plurality of the nodes, each timestamp being generated by one of the nodes relative to a local time reference thereof. A pairwise clock error is computed for at least one pair of nodes based upon a plurality of network messages passed therebetween. A global time reference is adaptively established for the timestamps responsive to the pairwise clock error. A plurality of mapping factors are defined each for translating from one local time reference to the global time reference. The mapping factors are selectively applied to corresponding ones of the timestamps.

BRIEF DESCRIPTION OF THE DRAWINGS

FIG. 2 is a schematic diagram conceptually illustrating a hyperbola satisfying TDOA conditions relative to a pair of nodes;

DETAILED DESCRIPTION OF THE PREFERRED EMBODIMENTS

Notation

Figure 1:
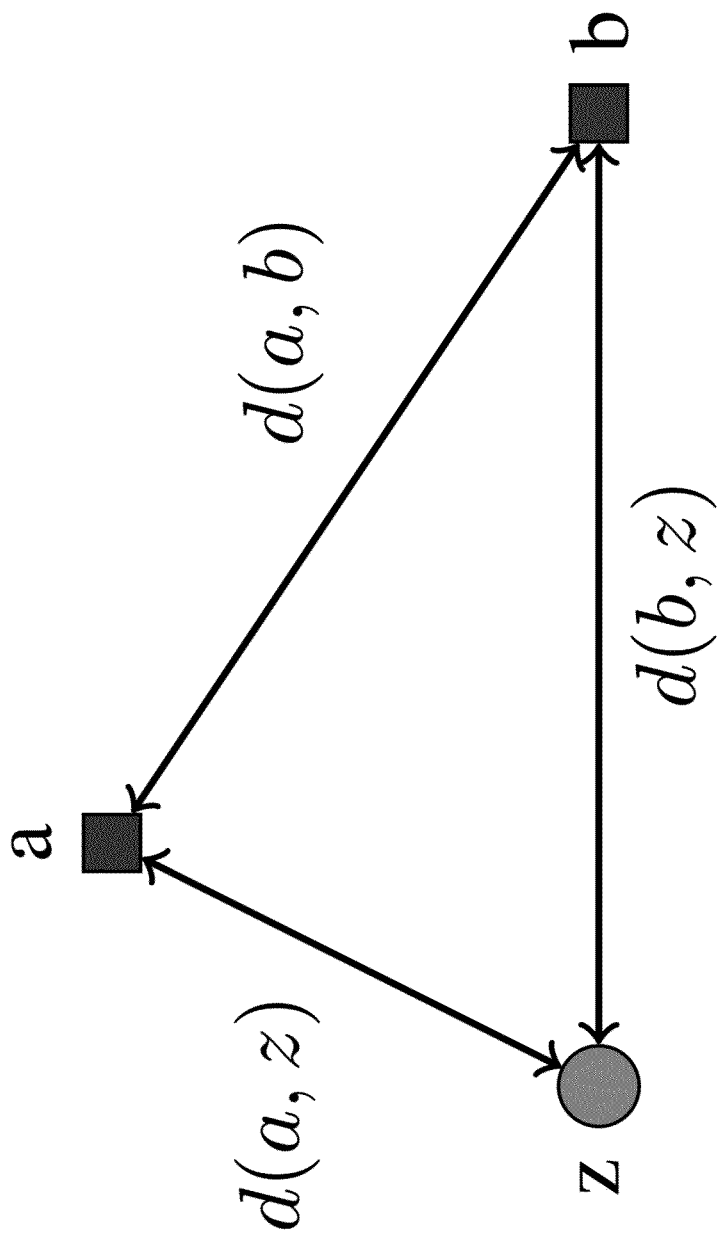
FIG. 1 is a schematic diagram illustrating time distances between participating and nonparticipating nodes for a location system of a wireless communication network.

A. Distance $D(p, q)$ is the Euclidean distance between node positions p and q.

$$D(p,q) = \sqrt{(x_p-x_q)^2+(y_p-y_q)^2+(z_p-z_q)^2} \quad (4)$$

It is easier to describe distances in terms of light propagation time, $$d(p, q) = \frac{D(p, q)}{\text{speed of light}} \quad (5)$$

approximating a uniform speed of light to be $2.998*10^8$ m/s.

B. Time

The following conventions are adopted herein for referencing time values. The value t represents the common absolute time at all locations, ignoring any relativistic effects. Means for measuring t directly are not readily available, since any time measurement is typically made by a node in the local time of its internal clock. Local times are represented herein by the symbol $\tau$. A general local time measured at node a is denoted relative to absolute time t by $\tau_a(t)$. Unless otherwise indicated, the subscript designates the node whose local clock time is recorded.

Of particular interest are times corresponding to those instants when a message is either sent or received by the given node. Send and receive times for network messages are represented as follows:

$t^s(i)$ Send time of message i sent by node s;

$t_r^s(i)$ Receive time of message i sent by node s and received at node r;

$\tau^s(i)$ Send time measured at node s of message i sent by node s; and, $\tau_r^s(i)$ Receive time measured at r of message i sent by node s and received at node r.

The offset between two clocks may be measured in two distinct ways. Both are important for computing distance and time.

The difference $\theta_{a \to b}$ between two local clock counters is measured at a specific local time. Assuming constant clock drift rates, this difference is a linear function. This is the more natural way of thinking about clock offset.

The difference between two clocks is measured on a virtual global clock timescale. Assuming constant clock drift rates, this difference is constant.

Each clock $\omega$ is assumed to run at a rate $\beta_\omega = 1 + \delta_\omega$, where $|\delta_\omega| < 10^{-4}$. Either the $\beta$ or $\delta$ notation may be used depending on the context. The calculation of relative clock drifts has two distinct estimates.

$$\hat{\beta}_b / \hat{\beta}_a$$

The point estimate of slope is the primitive.

$$\overline{\beta_b / \beta_a}$$

The cumulative estimate of slope may use multiple point estimates.

C. Communication Nodes

As used in connection with location system applications herein, communication nodes are generally referenced based upon whether they do or do not participate in the given system's location protocol and whether they have known locations. All nodes are presumed to transmit messages with a common wireless network communication protocol.

Target nodes include any node that is to be located, which naturally have unknown location.

Anchor nodes both participate in the location protocol and have known location.

Mobile nodes participate in the location protocol but do not have known location.

Landmark nodes do not participate in the location protocol but have known location.

Stranger nodes neither participate in the location protocol nor have known location.

Rogue nodes are stranger nodes that are malicious or otherwise pose a threat.

Location protocol participants are capable of timestamping messages. Usually, this includes both sent and received messages, but in some cases only receive message timestamps may be available. All timestamps recorded by participant nodes are available for location computation.

Nodes with known location are not necessarily fixed. Their location information is simply known through outside sources and accordingly updated over time if the node is moving.

Adaptive Synchronization

In broad concept, the present invention provides a system and method which collects timing information locally generated by a plurality of independently clocked nodes of a wireless network, and effectively synchronizes them according to a common frame of reference adaptively obtained therefor. No clock of any node is necessarily slaved to another's. Nor is a forced correction imposed on any node's clock. Rather, the locally generated timing information is simply collected and adaptively synchronized for distance measurement, location finding, or any other such suitable use requiring consistently precise interpretation of the collected timing information. In this manner, a truly passive synchronization of the disparately referenced timing information collected is effected, and the need for any substantial modification or reconfiguration of the nodes themselves altogether obviated.

The timing information in an illustrative embodiment of the present invention is provided by the network's nodes as locally generated event timestamp data. For example, the event timestamp data may be generated each time a node receives a message, and each time it sends a network message. Such send and receive timestamps may then be collected between a set of nodes, and a common frame of reference imposed for the set of nodes. This is based on comparative measures of certain clock parameters between sending and receiving node clocks relative to a global consensus frame of reference based upon a virtual global clock.

Measuring time accurately for system-wide use in a system which uses multiple independently-running clocks (at remote wireless nodes) is difficult because each node references its time to its own local clock. Even if the timestamping carried out at each node were perfectly accurate with infinite precision, any calculation using multiple clocks must still reconcile differences in clock start times and variations in each clock's frequency.

The clock synchronization effected in accordance with the present invention not only accounts for the fact that the timestamping process in actuality incurs some delay (unique to a node's individual local clock), but also reconciles these other parametric differences of the nodes' multiple, independent clocks. Preferably, a consensus clock synchronization approach is implemented in accordance with the present invention to model a virtual global clock which adaptively accounts for local clock difference and even their nonlinear behavior in a practical setting. The consensus clock synchronization approach is based on dynamic measurements of clock offsets and clock drift. It finds particularly useful application in time-based distance measurements.

Accurate time measurement in accordance with the present invention is based on timestamp information generated by the nodes of the given wireless communication network. For system-wide use, the timestamp information collected from different nodes must be synchronized—that is mapped to a common system-wide frame of reference. A standard technique known in the art (for example, simple network time protocol (SNTP)) synchronizes two clocks by adjusting their times to match within a fixed precision $\epsilon$. An alternative approach to synchronization taken in accordance with the present invention is to define virtual clock functions $f_a$, $f_b$ to map times obtained from physical local clocks to a synchronized virtual clock, as indicated in the table below.

| Synchronization | Definition |
| --- | --- |
| standard | $|\tau_a(t) - \tau_b(t)| \in$ common simultaneous event at multiple nodes |
| virtual | $|f_a(\tau_a(t)) - f_b(\tau_b(t))| < \epsilon$ define functions mapping local clock times to common time scale |

Figure 1A:
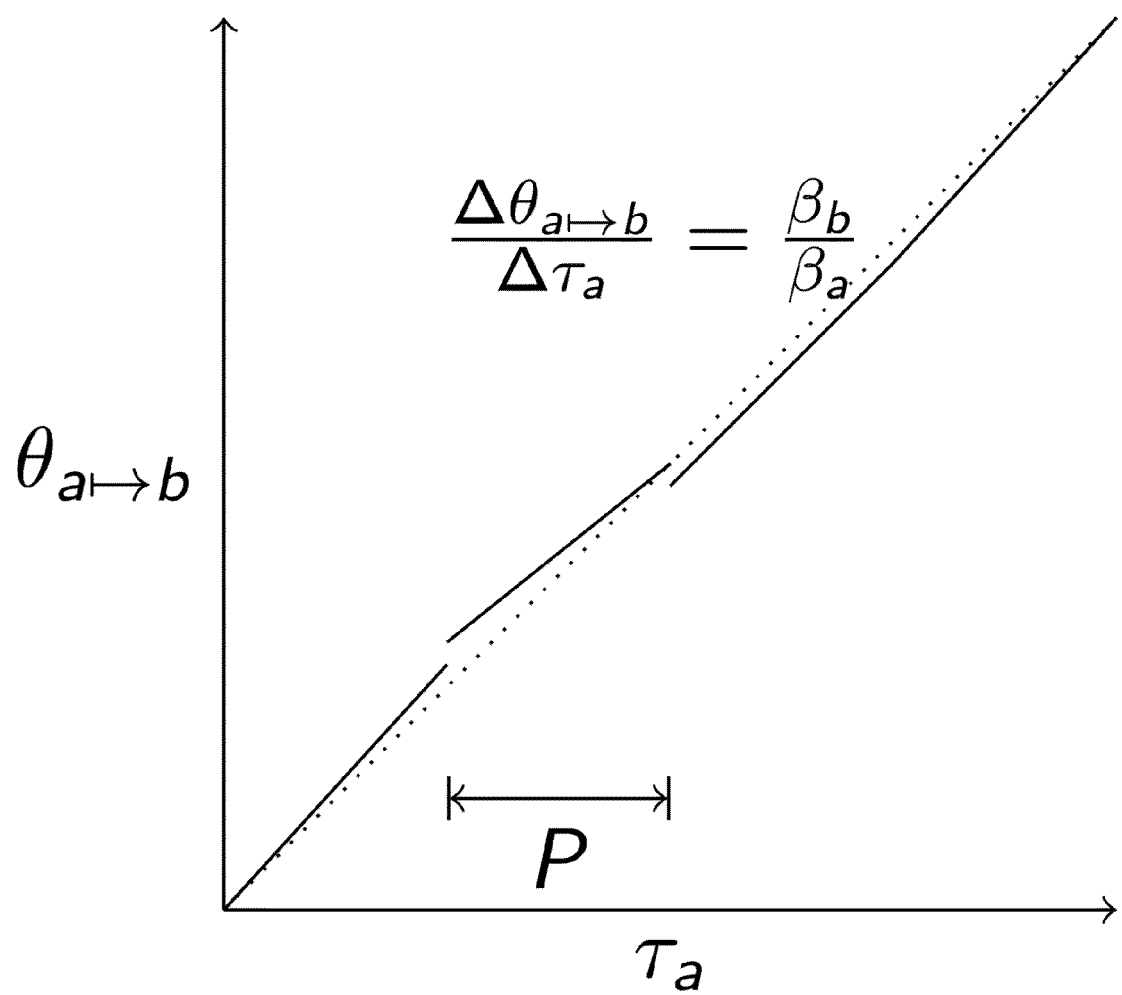
FIG. 1A is a schematic diagram illustrating a piecewise linear relationship between certain parametric values utilized in accordance with an exemplary embodiment of the present invention.

This single, synchronized virtual clock is then applicable to all nodes. Instead of fitting an explicit linear clock model to the stamp measurements, offsets between two clocks are thereby tracked implicitly to define an offset function which enables translation between the timescales of the two different clocks. (See the Estimation of Dynamic Clock Parameters section below.) With each round of messages passed between the two clocks' nodes, piecewise linearity is presumed. This yields a plurality of piecewise linear functions such as illustrated in FIG. 1A.

Consensus clock synchronization in accordance with the present invention implements a distributed technique by which a set of clocks $\Omega$ map their local times to a consensus time scale. The network model of this approach treats all nodes equivalently, such that there is no root node. The node clocks are taken to be of similar quality, in that each node communicates only with its neighbors (without requiring any intermediate routing) and does so using only local information.

Consensus clock synchronization computes a consensus linear clock model, whose slope represents the consensus clock drift rate. The consensus may change over time due to variations in the node clocks' frequencies.

Consensus clock synchronization includes the estimation of pairwise clock drift and offset for network neighbors. This requires the ability for the nodes to timestamp outgoing and incoming messages. Local bias delays in generating received timestamps and sent timestamps must also be corrected for.

With this synchronization approach, each node uses a function $f$ to map its local time to the consensus timescale. Comparisons between times collected from different nodes are then made only after converting the local time information to this consensus timescale. The local clocks are considered to be synchronized if for any given time t, the differences between the $f$-mapped local measurements of that time is less than a small predetermined error $\epsilon$.

For the purposes of consensus clock synchronization, the network is prefereably modeled as a weighted, undirected graph $G(\Omega, E)$, where $\Omega$ represents the number of nodes and E represents the set of edges in the network graph. The network nodes are presumed to be connected for bidirectional communication therebetween. The weight of an edge is taken to represent the propagation delay over a link. All nodes are also presumed to be self-connected, with the neighborhood of a node a being represented by $\Omega_a$ and $a \in \Omega_a$.

The two general elements for mapping local time to consensus time are:

(1) clock drift, and
(2) clock offset.

Clock Drift

Figure 6:
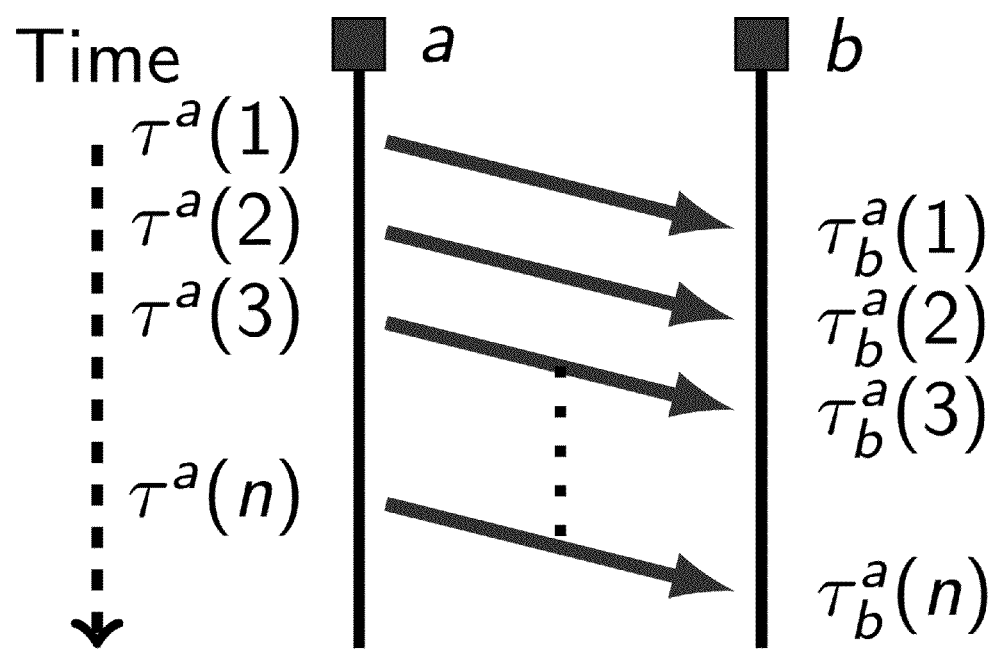
FIG. 6 is a schematic diagram representing a sequence of messages passing from one node to another in a wireless communication network used in computing a measure of clock drift between local clocks of the nodes according to one aspect of the present invention.

Messages for determining clock drift may be received from paired nodes in the manner illustrated in FIG. 6. Pairwise clock drift between paired nodes a and b may be determined according to equation 1.2 shown below.

$$\frac{\beta_b}{\beta_a} = \frac{\tau_b^a(i) - \tau_b^a(i-1)}{\tau^a(i) - \tau^a(i-1)} \quad \text{(Eq. 1.1)}$$

By measuring the pairwise clock drift ratios of paired nodes in this manner, the ratio between the consensus clock rate, represented by $\beta_*$ (and defined to be the average drift rate of the nodes in $\Omega$) to the clock drift rate of each node $\omega$, $$\frac{\beta_*}{\beta_\omega},$$

may be computed. The consensus clock rate $\beta_*$ would then be defined as follows:

$$\beta_* = \frac{1}{\Omega} \sum_{\omega \in \Omega} \beta_\omega \quad \text{(Eq. 1.2)}$$

The clock drift in fully connected graph may then be expressed in matrix (A) form by estimating the pairwise clock drift ratios of the set of clocks $\Omega$, where:

$$A = \frac{1}{|\Omega|} \begin{bmatrix} 1 & \frac{\beta_b}{\beta_a} & \frac{\beta_c}{\beta_a} & \cdots \\ \frac{\beta_a}{\beta_b} & 1 & \frac{\beta_c}{\beta_b} & \cdots \\ \frac{\beta_a}{\beta_c} & \frac{\beta_b}{\beta_c} & 1 & \cdots \\ \vdots & \vdots & \vdots & \ddots \end{bmatrix} \quad \text{(Eq. 1.3)}$$

The eigenvector x for the greatest eigenvalue ($\lambda=1$) of the matrix A contains conversions from local clock to virtual global clock.

$$x = \begin{bmatrix} \frac{\beta_*}{\beta_a} \\ \frac{\beta_*}{\beta_b} \\ \frac{\beta_*}{\beta_c} \\ \vdots \end{bmatrix} \quad \text{(Eq. 1.4)}$$

Each node may directly compute its corresponding eigenvector entry by averaging its locally available clock drift ratios with reference to equation 1.3. By way of example, the eigenvector entry for node A would then be defined by:

$$\frac{\beta_*}{\beta_a} = \frac{1}{\Omega} \sum_{\omega \in \Omega} \frac{\beta_\omega}{\beta_a} \quad \text{(Eq. 1.5)}$$

The resulting eigenvector entry is the ratio of the consensus clock drift $\beta_*$ relative to one particular node's clock drift value. This enables each node to convert its local time to the same consensus time scale running at rate $\beta_*$.

For the more general case of computing average clock drift, the entries of matrix A of equation 1.3 may be generalized based on the existing graph edges for the case when all nodes are not directly connected. With the parameter $k_{\omega_1, \omega_2}$ defined as shown below according to whether an edge is disposed between nodes $\omega$1 and $\omega$2, matrix A may be expressed more generally as shown by equation 1.6.

$$k_{\omega_1, \omega_2} = \begin{cases} 0 & \text{if } (\omega_1, \omega_2) \notin E \\ \frac{\beta_{\omega_2}}{\beta_{\omega_1}} & \text{if } (\omega_1, \omega_2) \in E \end{cases} \quad \text{(Eq. 1.6)}$$

$$A = \begin{bmatrix} \frac{1}{|\Omega_a|} & \frac{k_{b,a}}{|\Omega_a|} & \frac{k_{c,a}}{\Omega_a} & \cdots \\ \frac{k_{a,b}}{\Omega_b} & \frac{1}{|\Omega_b|} & \frac{k_{c,b}}{|O_b|} & \cdots \\ \frac{k_{a,c}}{\Omega_c} & \frac{k_{b,c}}{|\Omega_c|} & \frac{1}{|\Omega_c|} & \cdots \\ \vdots & \vdots & \vdots & \ddots \end{bmatrix} \quad \text{(Eq. 1.7)}$$

Each row of the more generalized matrix A corresponds to relative clock drifts involving one node $\omega$. The number of non-zero entries for the row corresponding to $\omega$ is therefore $|\Omega_\omega|$. The eigenvector x is found to remain unchanged from the fully connected case.

The matrix A is nonnegative, and it is irreducible because the network graph is presumed to be strongly connected. Since all network graph edges are presumed to be bidirectional and there are self-loops, A will be aperiodic. An interative power method known in the art may be applied to find the eigenvector x corresponding to the eigenvalue $\lambda=\rho(A)=1$.

Each node may iteratively compute its own eigenvector entry using only locally available clock drift ratios. For example, node A maintains $$\frac{\beta_*}{\beta_\omega} = 1$$

for its initial state. The eigenvector entries for subsequent states of node a may be computed accordingly, as follows:

$$\frac{\beta_*}{\beta_a}(i+1) = \frac{1}{|\Omega_a|} \sum_{\omega \in \Omega_a} \left[(k_{w,a}) * \frac{\beta_*}{\beta_\omega}(i)\right] n \xrightarrow{\lim} \infty \frac{\beta_*}{\beta_{a(n)}} = \frac{\beta_*}{\beta_a} \quad \text{(Eq. 1.8)}$$

Node A then publishes its own $$\frac{\beta_*}{\beta_a}$$

value to its neighbors, with the neighbors then updating their own states accordingly. This process is repeated iteratively, eventually converging to the eigenvector entry. This iterative process is independent of any additional measurements taken to update the matrix clock drift entries.

Offset

The second of the two general elements for mapping local time to consensus time is clock offset. Where the consensus time scale $\beta_*$, the relative offset between clocks (or pairwise clock offset) is defined according to equation:

$$\theta_{a \to b} = \frac{1}{2}\left[\frac{\beta_*}{\beta_b}(\tau^b + \tau^a_b) - \frac{\beta_*}{\beta_a}(\tau^a + \tau^b_a)\right] \quad \text{(Eq. 1.9)}$$

$$= \beta_*(\alpha_b - \alpha_a) + \frac{1}{2}\frac{\beta_*}{\beta_b}(s_b + r_b) - \frac{1}{2}\frac{\beta_*}{\beta_a}(s_a + r_a)$$

The offset $\theta_{a \to b}$ denotes the offset of node A's clock from node B's clock in the consensus time scale. This offset is computed from network message timestamps received from the two local clocks. This offset computation is made based on the clock drifts computed as described in preceding paragraphs.

The consensus clock offsets, $\theta_{a \to *}$, represents the offset of node A's clock from the consensus global clock in the consensus timescale. Each local clock's consensus offset may be determined as shown below:

$$\theta_{a \to *} = \frac{\beta_*}{|\Omega|} \sum_{\omega \in \Omega}(\alpha_\omega - \alpha_a) \quad \text{(Eq. 1.10)}$$

$$= \frac{1}{\Omega} \sum_{\omega \in \Omega}(\theta_a \to \omega)$$

The pairwise consensus offset between each and every pair of nodes in the set $\Omega$ is computed and collected. In the general case where the nodes are not fully connected, nodes may measure their offsets with only a strict subset of nodes within $\Omega$. In this case, the consensus clock offset $\theta_{a \to *}$ is iteratively computed. In this process, each node's consensus offset is initialized to zero:

$$\forall \omega \in \Omega, \theta_{\omega \to *}(0) = 0 \quad \text{(Eq. 1.11)}$$

Each node iteratively updates its consensus offset estimate using both its neighbors' consensus offset estimates and current pairwise offsets relative to those neighbors as follows:

$$\theta_{a \to *}(n+1) = \frac{1}{\Omega_a} \sum_{\omega \in \Omega_a}(\theta_{a \to \omega} + \theta_{\omega \to *}(n)) \quad \text{(Eq. 1.12)}$$

After each iteration, each node $\omega$ publishes its updated $\theta_{\omega \to *}$ value to its neighbors.

By consensus agreement, the offsets converge as follows:

$$\lim_{n \to \infty} \theta_{a \to *}(n) = \theta_{a \to *} + \phi \quad \text{(Eq. 1.13)}$$

$\phi$ is dependent upon $\alpha$ values and neighborhood sizes and is invariant across nodes.

Translation to Virtual Global Clock

Once the drift and offset measures are computed in the consensus, or virtual global, timescale of the consensus, or virtual global clock, local time measures made at the different nodes may be readily translated to its corresponding global virtual time, as follows:

$$\tau_* = f_a(\tau_a) = \frac{\beta_*}{\beta_a}\tau_a + \theta_{a \to *} \quad \text{(Eq. 1.14)}$$

If the local nodes' different local times, such as $\tau_a$ and $\tau_b$ of nodes a and b are to be compared, their corresponding global virtual time values of $f_a(\tau_a)$ and $f_b(\tau_b)$ are compared to preserve consistency and accuracy. The advocacy of consensus clock synchronization provided in accordance with the present invention is demonstrated by a simulation implementing the same. The simulation system included nodes configured with fixed pre-set clock drifts. For each node $\omega$ within the full set of nodes $\Omega$, the clock drift was factored into the node's clock rate $\beta_\omega = 1 + \sigma_\omega$ having the initial starting values $\alpha_\omega$. Each node was set to broadcast two messages at specified times node send times were captured in local clock values.

Figure 1B:
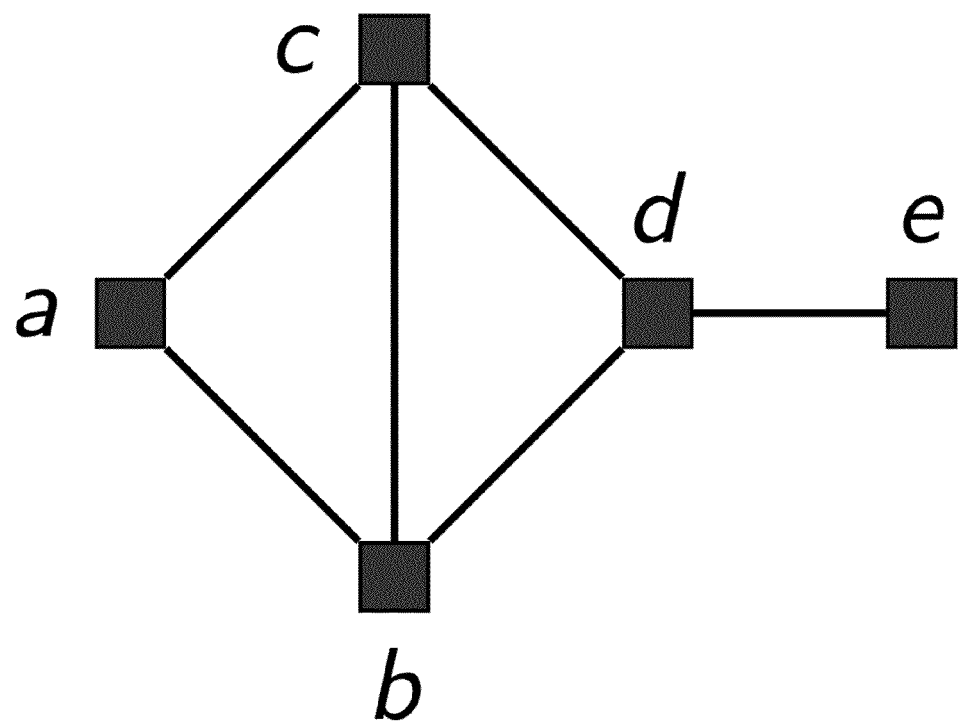
FIG. 1B is a schematic diagram showing an example of a network graph for modeling a neighborhood of distributed nodes to be adaptively synchronized in accordance with an exemplary embodiment of the present invention.
Figure 1C:
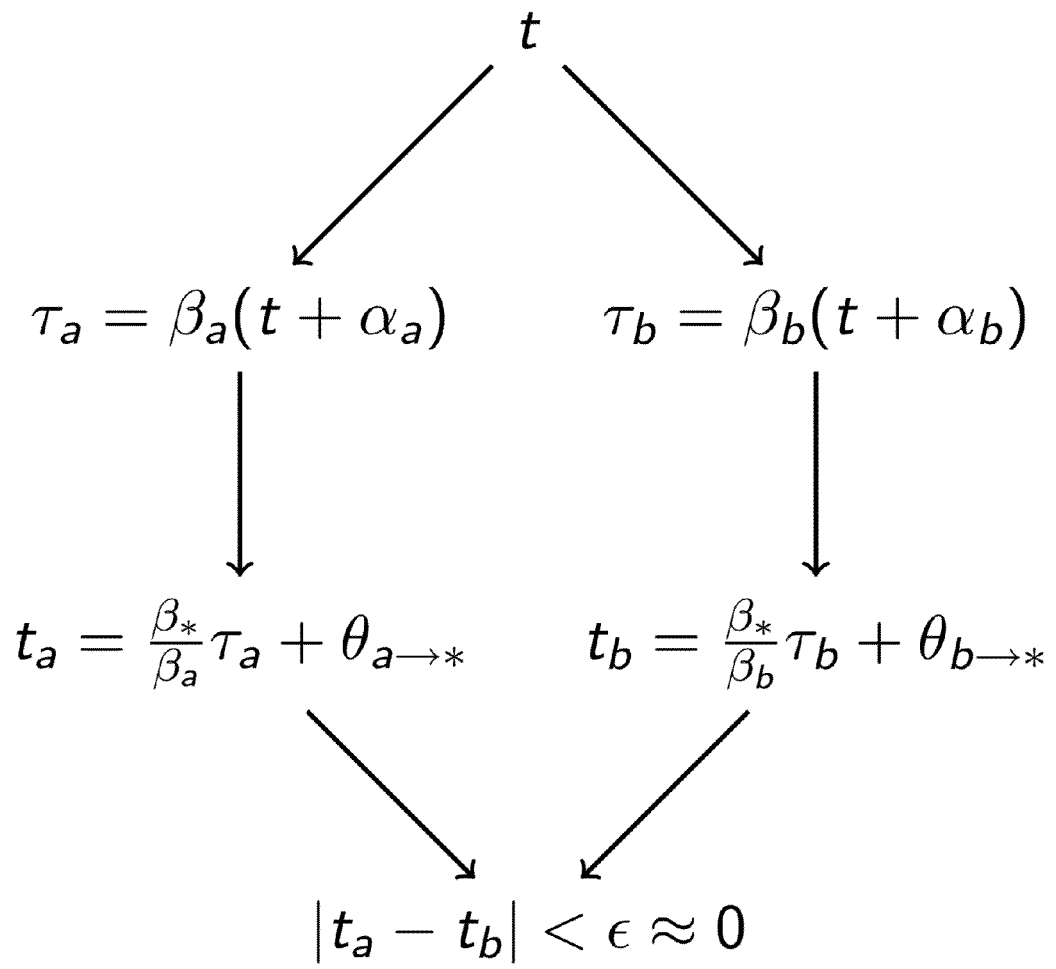
FIG. 1C is a schematic diagram illustrating a verification scheme example for verifying in a simulated environment the efficacy of adaptive synchronization implemented in accordance with an exemplary embodiment of the present invention.

Received times for the messages were computed for neighbors according to the connectivity and distances set in a corresponding network graph similar to that illustrated in FIG. 1B. A plurality of similar network message times were used to apply a plurality of iterations (for example, 100) of the clock drift and offset calculations in the manner set forth in preceding paragraphs. The $\beta$ and $\theta$ values were thus obtained as shown in the verification scheme illustrated in FIG. 1C, the local times are used as described in preceding paragraphs to determine the pairwise clock drifts $$\frac{\beta_b}{\beta_a}, \frac{\beta_c}{\beta_a},$$

... and pairwise clock offsets $\theta_{a \to b}, \theta_{a \to c}, \ldots$. These values are then used to compute the consensus time for each (relative to the virtual global clock) for each node $\omega$ in terms of global clock drift $\frac{\beta_*}{\beta_\omega}$ and global clock offset $\theta_{\omega \rightarrow *}$.

The results of simulation verify that a set of connected nodes may be adaptively synchronized according to a virtual global clock reference based on timestamped network messages passed between them in distributed manner. The implementation with actual physical clocks at the different nodes would factor in the timestamping bias and errors unique to each clock. These parametric values will bear on the actual level of accuracy realized by consensus synchronization, as will the network's actual graph diameter and number of iterations in computing $\frac{\beta_*}{\beta_\omega}$ and $\theta_{\omega \rightarrow *}$.

Example

Adaptive Synchronization Intime-Based Location

A particularly effective application of the subject method and system for adaptive synchronization of otherwise unsynchronized timing information is in the accurate time-based location of communication nodes in a wireless network. Referring to FIG. 1, wireless location systems based on time measurements generally fall into two basic categories, namely: time of arrival (TOA) and time difference of arrival (TDOA). TOA measures the distance between two nodes a and b.

$$TOA(a,b)=d(a,b) \quad (2)$$

If a is an anchor node, and b is a mobile node, the locus of possible positions of node b satisfying the distance equation is a sphere centered at node a.

TDOA measures the difference of the distances between a single node z and two participant nodes a and b.

$$TDOA(a,b,z)=d(b,z)-d(a,z) \quad (3)$$

As illustrated in FIG. 2, the locus of possible positions of node z satisfying the distance equation defines a hyperboloid with its foci at the positions of nodes a and b.

In the time based system category, the popular global positioning system (GPS) relies on participation of all mobile nodes, usually referred to as the receivers. Each receiver, although it does not send any messages, is solely responsible for computing its own location. Existing TOA location systems for 802.11 hardware include the so-called PinPoint TOA. PinPoint TOA relies upon the local timestamping of both send and receive times of network messages at two nodes to measure TOA. This requires the nodes to be cooperative participants in the location system. Certain known TOA systems exploit the short interframe spacing between sequences of packets such as data and ACK packets to measure TOA. Such systems are thereby dependent upon protocol particularities, and thus not communication protocol agnostic. They also require the exchange of packets between multiple participating nodes and the node being located, which may not be possible unless all nodes are participants.

Known TDOA systems such as LORAN for ship navigation and E-OTD for mobile phones are not accurate enough when actually implemented. Typically, they exhibit accuracies on the order of 50 m. LORAN and one variant of E-OTD also require the nodes to be participants.

The ability to measure location using time of flight in conventional wireless networks, such as IEEE 802.11 type networks, has been heretofore impeded by various factors, like the standard one microsecond clock resolution, imprecise synchronization of the 802.11 protocol, and the inaccuracy of the available clock oscillators. According to one aspect of the present invention, a system incorporating off-the-shelf 802.11 hardware is configured to accurately determine locations of transmitting 802.11 devices according to a TDOA technique. A TOA PinPoint clock model for 802.11 wireless cards is programmably reconfigured according to certain aspects of the present invention to provide a location system which implements a TDOA technique and provides heightened accuracy in locating nodes operating on free running clocks. The location system adaptively translates times from one frame of reference to another, such that locations of transmitting nodes may be determined with heretofore unseen combination of simplicity and accuracy. In certain applications, for example, location accuracies within 3 m may be realized.

An added advantage of the system is that nodes may be accurately located, regardless of their participation in the location system. Moreover, the location system may be implemented with other wireless communication protocols, where suitable send and receive timestamps are available in communications between nodes.

In accordance with one exemplary embodiment of a location system, 'anchor' nodes with known location are used to compute the location of other nodes. These other nodes may be mobile nodes, which actively participate in the location system. Alternatively, they may be nonparticipants which communicate using the wireless medium but do not participate in the location determination process directly. While other location system variants may be implemented without anchors in alternate embodiments, the case with anchors is the simplest to illustrate.

The TDOA location system is preferably implemented to meet the following criteria in a wireless network broadcast environment:

1) Capable of locating nonparticipants;
2) Is implementable using inexpensive, off-the-shelf hardware;
3) Is communication protocol agnostic; and
4) Capable of locating nodes accurately, with error less than approximately 3 m.

The capability to locate nonparticipants enables the location system to be deployed with minimal impact on the existing software and hardware of the wireless system. The location system may then be deployed for an existing wireless network, and existing nodes may be located without changes. No other existing wireless location system heretofore known adequately meets the criteria listed above.

Figure 1D:
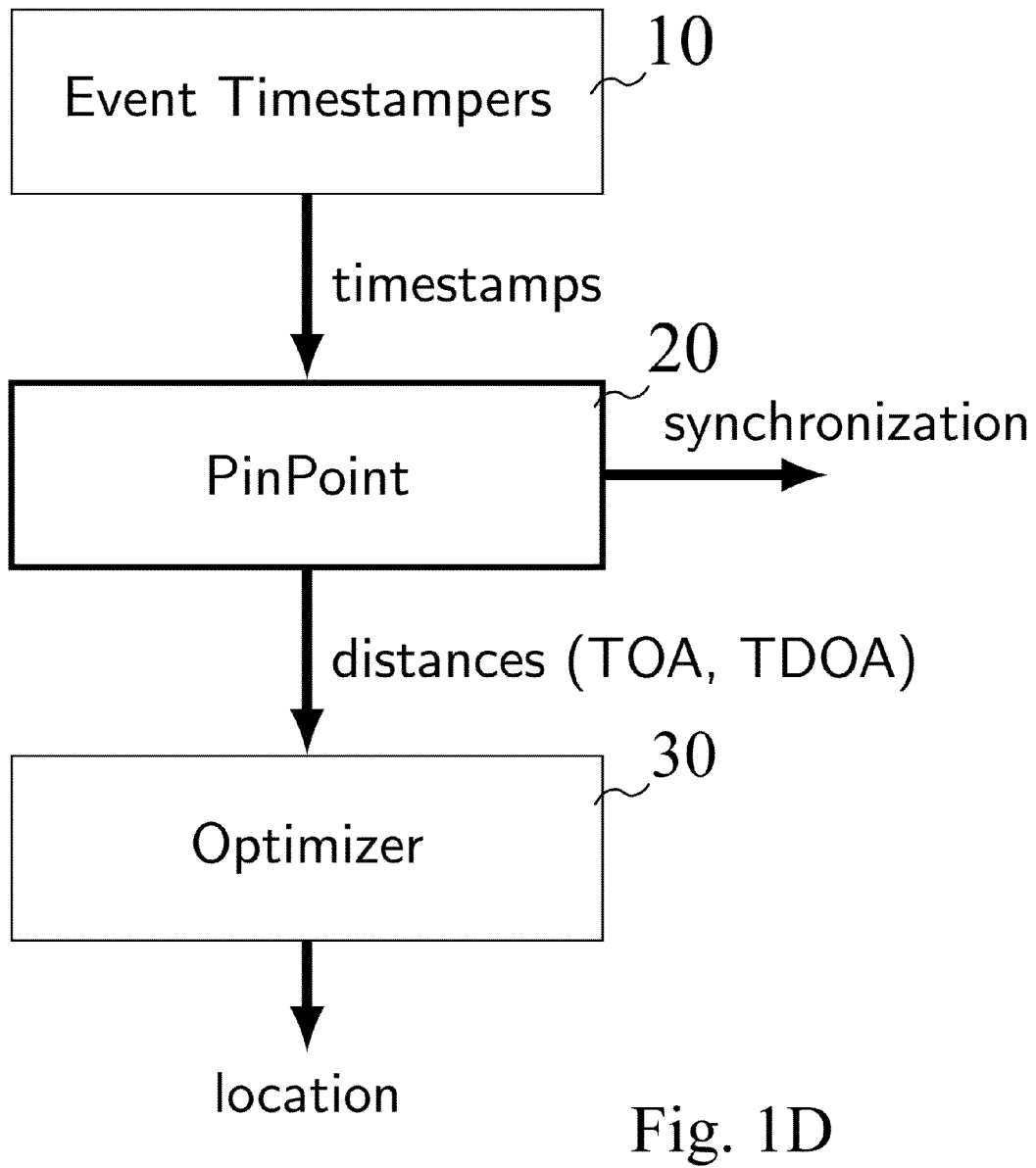
FIG. 1D is a flow diagram illustrating a general flow of processes carried out in a location system incorporating adaptive synchronization in accordance with an exemplary embodiment of the present invention.

Referring to FIG. 1D, there is shown a block diagram illustrating the general flow of processes to carry out time-based location finding for communicating nodes of a wireless network, in an exemplary embodiment of the present invention. The communication nodes operating within the network each serve as event timestampers 10 by including timestamps in their messages, both on outgoing (send) and incoming (receive) messages. The timestamping process itself is normally not a trivial process. Multipath effects result in multiple, interfering phase shifted copies of the signal, and for use in node positioning/location applications, the timestamp is applied to the direct path. Any suitable technique known in the art for multipath correction, such as edge curve fitting, or frequency, antenna, and spatial diversity may be employed for location purposes.

The collected timestamp data, respectively referenced to the local clocks of their generating nodes, are then combined by the PinPoint processing 20 to produce distance information, either TOA or TDOA. As mentioned, a PinPoint system known in the art is a TOA system. It makes use of a simple clock model for the local clocks and a predetermined protocol for the exchange of timestamped messages to determine the locations of nodes. In the disclosed system, the PinPoint approach is improved and extended to realize TDOA capabilities using consensus clock synchronization features in accordance with certain aspects of the present invention. As a result, a TOA system's limitation to distance measurements between only participant nodes is overcome, whereby the location of a non-participant transmitting node may be determined in two dimensions by use of three receiving nodes, and in three dimensions by use of four receiving nodes.

The time-based distance information obtained from processing 20 are then used by an optimizer 30 to solve the optimization problem defined by the distance information for location. Location information for both participant and non-participant nodes are thus generated by the optimizer 30.

In the exemplary embodiment disclosed, a TDOA location system provides simple yet highly accurate computing of TDOA even with nodes employing off-the-shelf 802.11 wireless cards which run independently on inexpensive local clocks. The efficacy of the location system is demonstrated by experimental results for a basic hyperbolic location application, as illustrated in following paragraphs. The TDOA location system may be realized with hardware in just about any wireless network system where participants can timestamp for both sending and receiving operations.

The TDOA location system should not be viewed as a direct competitor to existing TOA systems. The location information from the subject TDOA implementation of PinPoint may actually be complementary to TOA systems depending on the intended application. Fusion of TOA and TDOA information may be feasible in certain applications.

Time Measurement

For applications requiring precise location estimation to within meters, it is necessary to very precisely record and translate times. When recording times, latency is invariably a major challenge. Due to the interrupt latency variability (~μs) involved with CPU-based timestamping in modern operating systems, arriving packets need to be timestamped on the MAC clock. For MAC clock timestamping, appropriate hardware support is suitably accessed.

Ideally, every node clock would measure time indistinguishably. That is, every clock runs at exactly the same frequency such that times locally measured at different nodes could be directly compared. In practice, however, no two clocks will have exactly the same frequency, and clock frequencies may vary depending on oscillator stability. Significant frequency changes could occur over time periods on the order of seconds.

A. Basic Clock Model

In the disclosed system, each communication node is permitted to operate with an independent, free running local clock that records time in its own frame of reference. The goal of the clock model is to accurately convert times of two local clocks into a common frame of reference.

In typical applications, all clocks generally run with the same discrete precision (e.g. 25 ns, 1 μs). The local time $\tau$ may generally be expressed as:

$$\tau = \lfloor \beta(t+\alpha) \rfloor \quad (6)$$

The quantity $\tau$ is an integer, with the unit of time determined by the clock speed. The $\alpha$ value for a given clock is reflective of the clock being started independently at different time relative to the other clocks in the system; and, the $\beta$ value represents the running rate of a given clock (reflecting the fact that each individual clock runs at a slightly different rate). A discretization error is modeled by a separate term e, along with intrinsic receive and send delays characteristic of a particular node, such that the local time is more completely expressed as:

$$\tau^a = \beta_a(t^a + \alpha_a) + s_a + e^a \text{ send} \quad (7)$$

$$\tau_b^a = \beta_b(t^a + \alpha_b + d(a,b)) + r_b + e_b^a \text{ receive} \quad (7')$$

The term d(a, b) in the local receive time expression accounts for the actual transmit time between the nodes a and b.

Suitable linear regression is carried out to compute the linear relationship between two clocks' locally measured times. Measured time values, however, deviate significantly from linear behavior as typically evidenced by residuals of measured times. The offset between clocks successfully captures this behavior. Such offset and clock drift are used in accordance with the present invention to translate times into a common frame of reference.

B. Estimation of Constant Clock Parameters

Since a perfect clock does not exist, it is not possible to directly compute the values $\alpha$ or $\beta$ for any one clock. Composite values for two clocks are computed instead, with the values of these parameters assumed to remain constant.

For event i occurring at time t (i), participant nodes a and b measure the time separately at respective instants as follows.

$$\tau_a = \beta_a(t_0 + \alpha_a + d_a) + e_a \quad (8)$$

$$\tau_b = \beta_b(t_0 + \alpha_b + d_b) + e_b \quad (9)$$

The values d represent time delays based on the geometry (relative positions) of nodes a, b, and possibly a third node c. For the simple two node case, the model for time translation enables the $\tau_b$ to be solved in terms of $\tau_a$ as follows:

$$\tau_b = \frac{\beta_b}{\beta_a}\tau_a + \beta_b[(\alpha_b - \alpha_a) + (d_b - d_a)] + e_b - \frac{\beta_b}{\beta_a}e_a \quad (10)$$

This function is linear in $\tau_a$ and includes an error term $$e_b - \frac{\beta_b}{\beta_a}e_a.$$

Estimates of the slope $$m = \frac{\beta_b}{\beta_a}$$

and intercept $k=\beta_b[(\alpha_b-\alpha_a)+(d_b-d_a)]$ may be obtained using linear regression for multiple events.

There are two basic approaches to generating these multiple events with known values of d. The first approach is to cause node a to repeatedly send multiple timestamped messages to b. In this case, $d_a=0$ and $d_b=d(a,b)$. Another approach is to use reference broadcast synchronization techniques, where a third node c broadcasts a message that is received by both a and b. In this case, $d_a=d(a,c)$ and $d_b=d(b,c)$. Such distances are not adequately accounted for in known systems. The use of reference broadcasts in this manner provides the advantage of eliminating sender variability, but relies on the use of a third node.

C. Experiment to Determine Clock Parameters

In order to evaluate the extent of nonlinear effects, actual clock parameters may was illustratively determined for reference as follows. A data set was obtained for one access point (AP) c and two participant nodes a and b operating in both AP and monitor mode. The AP and nodes were placed together to make d(a,c)=d(b,c)=0 The AP generated 200 beacons per second. Nodes a and b were run with reference clock speeds of 40 MHz and sent 40 beacons per second. Over the experiment duration of ~220 seconds, nodes a and b recorded ~42000 beacons from the AP and ~8400 beacons from each other. Linear regression for reference broadcasts determined the clock relation to be:

$$\tau_b = (1 - 1.99 * 10^{-6})\tau_a + 889936589.95 \quad (11)$$

D. 802.11 Nonlinear Clock Behavior

Figure 3:
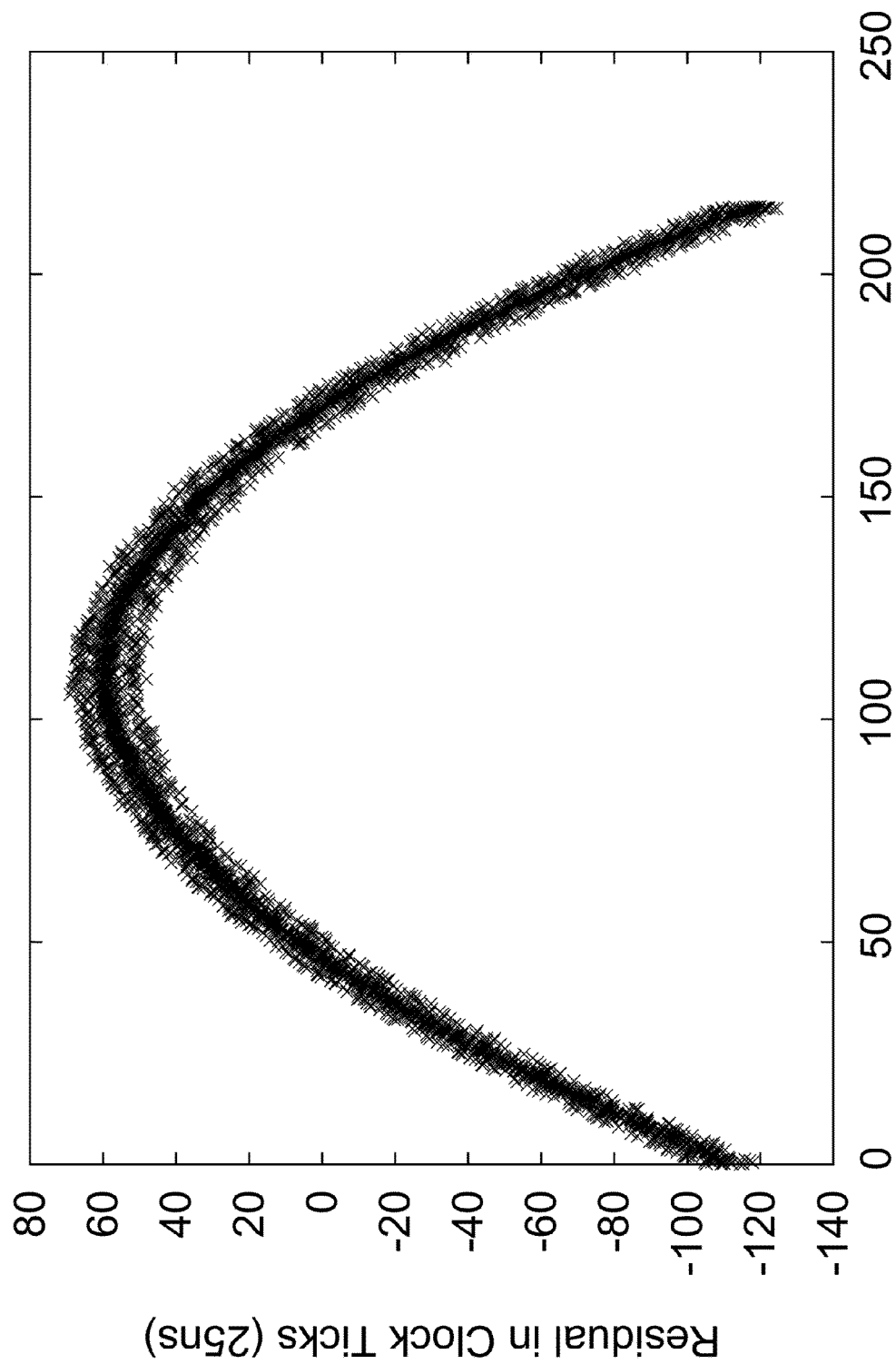
FIG. 3 is a graphic diagram illustrating nonlinear behavior of local clocks typically employed in currently known wireless network devices.

While each clock in the experimental setup was expected to behave linearly, it was observed empirically that the 802.11 clocks exhibited significant nonlinear behavior. The nonlinear behavior may be quantified using the residuals $\tau_b^c(i) - (m\tau_a^c(i) + k)$ for the received times $\tau_a^c(i)$ and $\tau_b^c(i)$ with the linear behavior from equation 11 removed. FIG. 3 illustrates the residuals for the reference broadcast line for nodes a and b running at 40 MHz. The deviation from the linear model ranges systematically between -127 and +70 clock ticks. Over the course of the experiment, this represents a deviation of less than 0.02 ppm, well within the 802.11 standard tolerance of 100 ppm. For a single TDOA measurement, however, using a simple linear model to translate clock times could result in distances off by as much as 950 m.

It is believed that a main factor contributing to such demonstrated nonlinear behavior is temperature. In standard 802.11 operating environments, variable temperature is expected, so the basic clock model is insufficient to completely characterize clock behavior.

E. Estimation of Dynamic Clock Parameters

Instead of fitting an explicit linear clock model to the timestamp measurements, the offset between two clocks may be tracked implicitly to define $\theta_{a \to b}(\tau)$. $\theta_{a \to b}(\tau)$ enables translation between the times of two different clocks. To translate a time $\tau_a$ from node a's timescale to a value on node b's timescale, the local time at node b is set such that $\tau_b = \tau_a + \theta_{a \to b}(\tau_a)$. Each point in the offset function is the result of one round of messages. Between the messages, the offset function is assumed to be locally linear, and an estimation of the relative clock drift is accordingly made to compute intermediate values.

Figure 4:
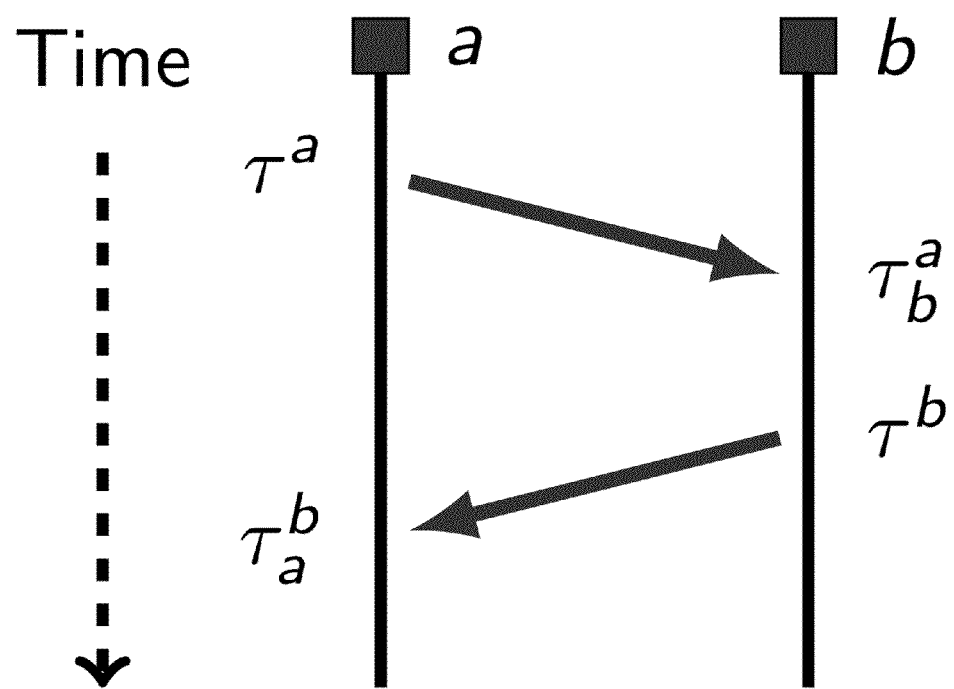
FIG. 4 is a schematic diagram representing a round of messages passing between a pair of nodes in a wireless communication network used in computing a measure of clock offset between local clocks of the nodes according to one aspect of the present invention.

1) Estimation of Offset:

Applying known Simple Network Time Protocol (SNTP) techniques for measuring clock offsets with network messages, send and receive timestamps are collected from one round of messages to estimate the clock offset $\theta_{a \to b}$ and roundtrip delay time $\delta$ for two network nodes. Of interest here is the offset $\theta_{a \to b}$. The messages and timestamps necessary for SNTP are shown in FIG. 4, where a message sent at time $t^a$ arrives at time $$t_b^a = t^a + \frac{1}{2}\delta,$$

and a message sent at time $t^b$ arrives at time $t_a^b = t^b + \frac{1}{2}\delta$. The SNTP equation, which ignores clock drift, for the offset $\theta_{a \to b}$ is:

$$\theta_{a \to b} = \frac{1}{2}[(\tau^b - \tau_a^b) + (\tau_b^a - \tau^a)] \quad (12)$$

The $\theta_{a \to b}$ measurement is associated with the average $$\overline{\tau}_a = \frac{1}{2}(\tau^a + \tau_a^b)$$

for times at node a.

Figure 5:
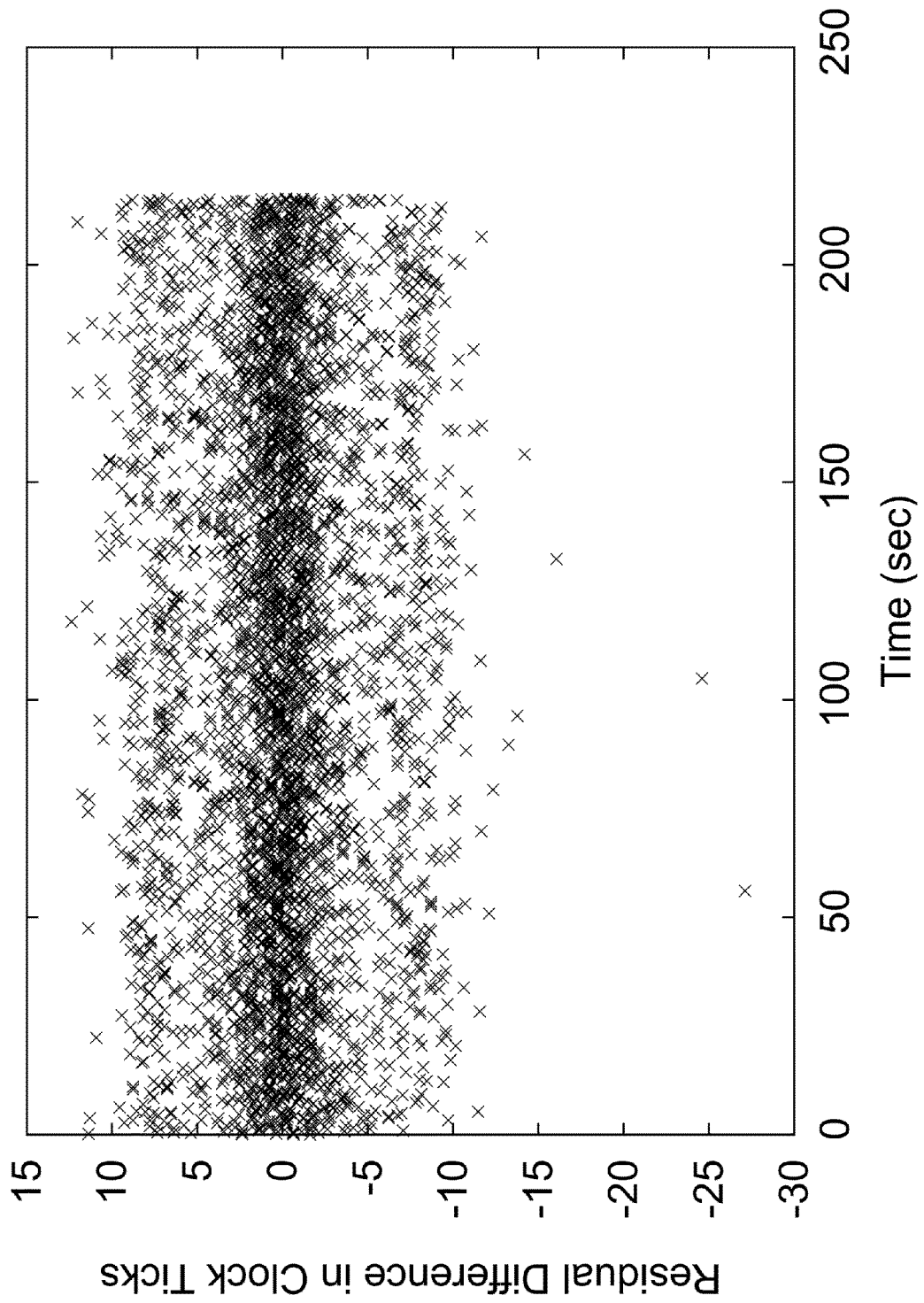
FIG. 5 is a graphic diagram further illustrating nonlinear behavior of local clocks typically employed in currently known wireless network devices.

The function $\theta_{a \to b}(\tau_a)$ captures the nonlinear clock behavior. The residuals with the line of least squares removed, $\theta_{a \to b}(\tau_a) - (m_\theta \tau_a + k_\theta)$, match those for the reference broadcast line. The match is evidenced by the difference of the residuals from the reference broadcast line and discrete $\theta_{a \to b}(\tau_a)$ without draft correction, as shown in FIG. 5. Since the mean function value over time is zero, $\theta_{a \to b}(\tau_a)$ reproduces the observed nonlinear clock behavior.

To find $\theta_{a \to b}(\tau_a)$ for an arbitrary time $\tau_a = \beta_a(t + \alpha_a)$, the closest messages to $\tau_a$ are found, then a correction term for clock drift added. The clock drift term depends on the time elapsed between $\tau_a$ and the time of the $\theta_{a \to b}$ measurement, $\tau_a =$ $$\frac{1}{2}\left(\tau^a + \frac{b}{a}\tau_a^b\right).$$

It is assumed that the error terms e for send and receive times are independent with standard deviation $\sigma$. The error from the SNTP equation terms then dominates because $$\left|\frac{\beta_b}{\beta_a} - 1\right| < 10^{-4} \ll 1.$$

$$\theta_{a \to b}(\tau_a) = \frac{1}{2}[(\tau^b - \tau_a^b) + (\tau_b^a - \tau^a)] + \quad (13)$$
$$\left(\frac{\beta_b}{\beta_a} - 1\right)\left(\tau_a - \frac{1}{2}(\tau_a^b + \tau^a)\right)$$
$$= \beta_b \alpha_b - \beta_a \alpha_a + (\beta_b - \beta_a)t + e$$
$$= \beta_b \alpha_b - \beta_a \alpha_a$$

$$+\left(\frac{\beta_b}{\beta_a} - 1\right)(\tau_a - \beta_a \alpha_a) + e \quad (14)$$

Since two clocks will run at different rates, that is $\beta_b \ne \beta_a$, $\theta_{a \to b}(\tau_a)$ will be a nonconstant, linear function of time.

2) Estimation of Clock Drift $$\frac{\beta_b}{\beta_a}:$$

It is necessary to estimate $$\frac{\beta_b}{\beta_a}$$

to compute the drift corrected offset in equation 13 and make accurate distance measurements. Clock drift is estimated using the set of messages sent from a sender S and arriving at receiver R as shown in FIG. 6. For index i corresponding to time, clock drift may be estimated using the simple slope equation $$m(i) = \frac{\tau_b^a(i+k) - \tau_b^a(i)}{\tau^a(i+k) - \tau^a(i)} \quad (15)$$

Individual measurement error may be reduced by increasing the value of k. A value of k=20 for the results reported here. An exponential filter is then applied to successive measurements with ω=0.995 to estimate the beta ratio. The ratio $$f(i) = \frac{\beta_r}{\beta_s}$$

is estimated for the time corresponding to index i.

$$f(i) := \omega * f(i-1) + (1-\omega)m(i) \quad (16)$$

Figure 7:
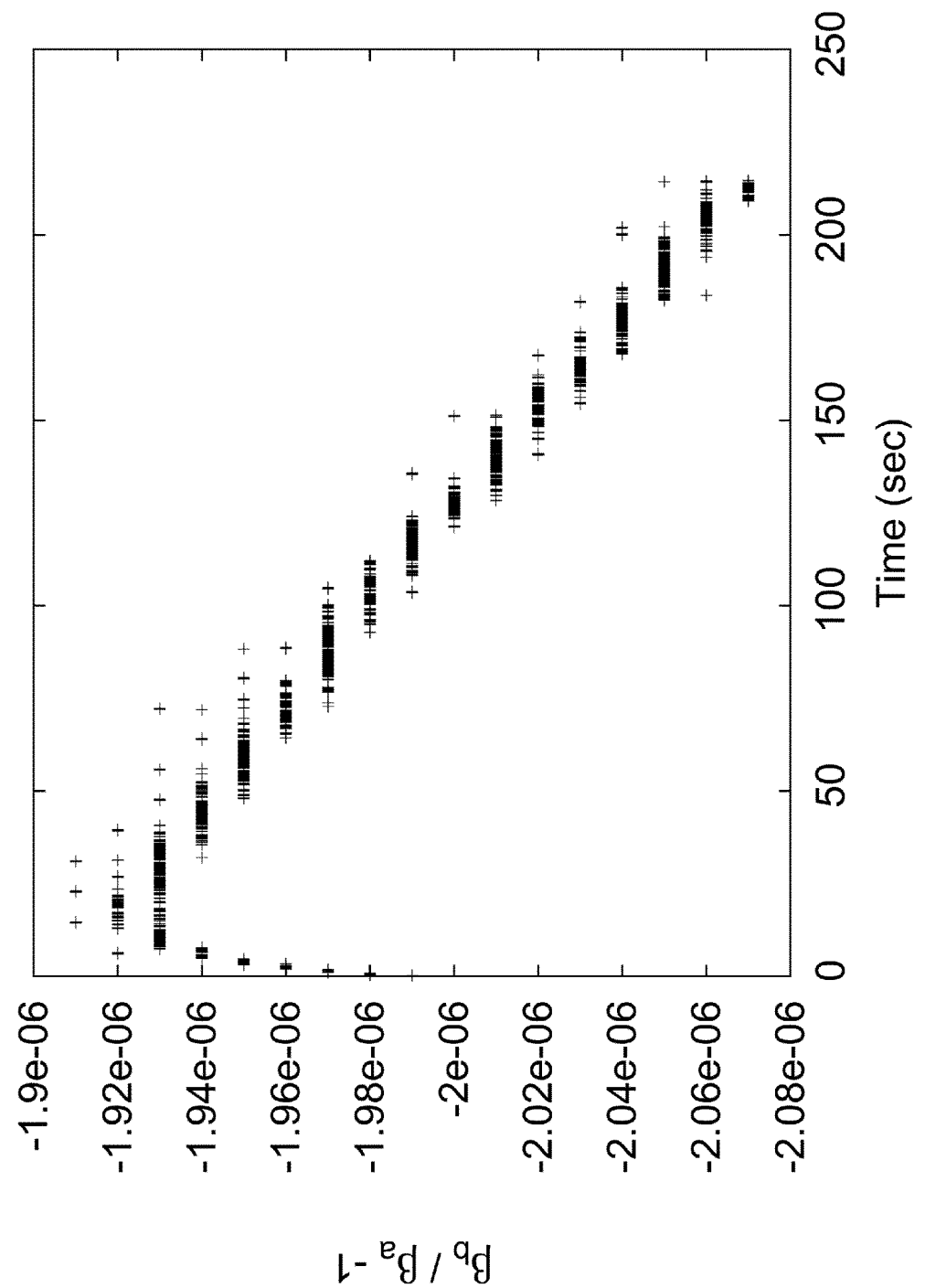
FIG. 7 is a graphic diagram illustrating a measure of clock drift estimated based on timestamps according to an exemplary embodiment of the present invention.

The results of applying the exponential filter to the experimental data set appear in FIG. 7. As expected from the nonlinear offset plot, the ratio $$\frac{\beta_b}{\beta_a}$$

is nonconstant. From the reference broadcast linear regression calculation for this data, $$\frac{\beta_b}{\beta_a} - 1 = 1.99 * 10^{-6}.$$

For the exponential filter, the value varies between $-1.91*10^{-6}$ and $-2.07*10^{-6}$.

Location System Implementing Pinpoint TDOA

As mentioned, known PinPoint systems use TOA to compute distance between PinPoint nodes. The systems incorporate a distributed, linear algorithm requiring no external clock synchronization to determine spatial topology. In contrast, the subject location system adapts PinPoint features to TDOA, measuring time difference of arrival for a nonparticipating, or non-PinPoint, node in order to locate its position. The location system improves significantly upon the basic clock model, for example, by incorporating individual card delay terms to enhance accuracy and obviate the need for synchronized local clocks. The system, moreover, improves estimation of β ratios preferably by replacing the simple slope calculation employed in known systems with an exponential filter.

Figure 8:
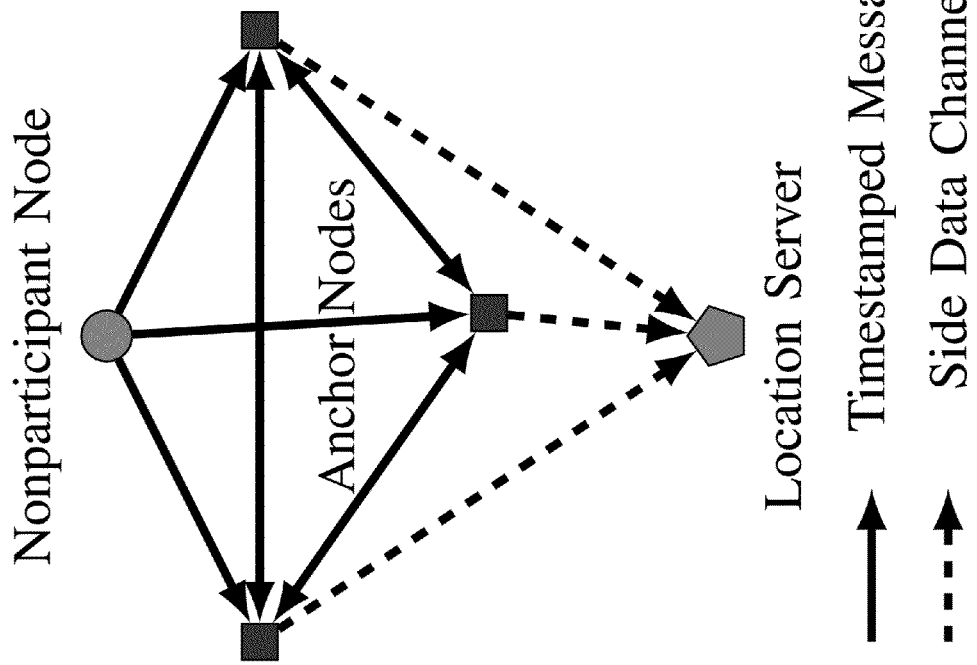
FIG. 8 is a schematic diagram conceptually illustrating an arrangement of nodes and location server in a TDOA location system for a wireless communication network implemented in accordance with an exemplary embodiment of the present invention.

The TDOA location system disclosed herein addresses situations where a nonparticipant node with known MAC address is transmitting. A set A of anchor nodes locates the nonparticipant node z using PinPoint TDOA and hyperbolic location. Anchor node times are translated between local clock times for TDOA comparison preferably using broadcast beacons sent among the anchors. The anchors send their timestamp data to a central location server programmably configured to process the data and solve the hyperbolic location problem defined by the PinPoint TDOA measurements. Illustrative movement of data is shown in FIG. 8.

In the disclosed embodiment, each anchor is equipped with a wireless card operating in AP and monitor mode. In AP mode, each card sends beacons at regular intervals. In monitor mode, each card records receive times for beacons from all other anchor nodes as well as the nonparticipant node z. Each beacon contains the AP's send time as specified in the 802.11 standard. Send times which may be presented by the nonparticipant are not used. Nonparticipant nodes do not report receive times. Anchors store the timestamps for each transmitting node in a separate circular buffer.

Figure 9:
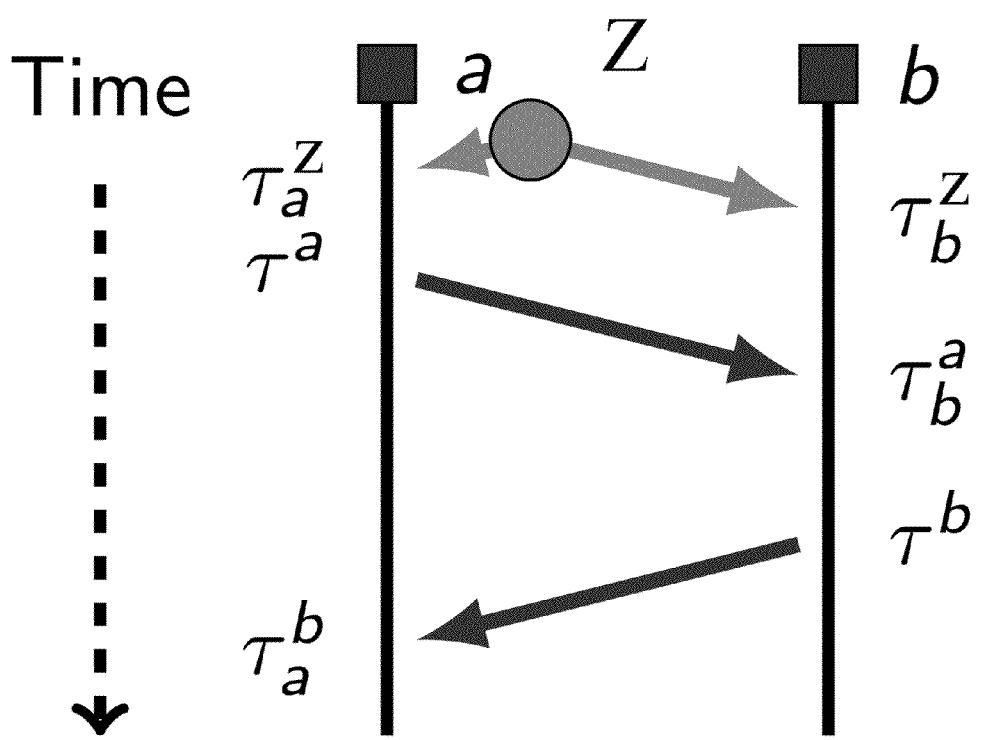
FIG. 9 is a schematic diagram representing a set of messages passing between participating and nonparticipating nodes in a TDOA location system for a wireless communication network implemented in accordance with an exemplary embodiment of the present invention.

The basic set of times needed for PinPoint TDOA measurements is shown in FIG. 9. This is the minimal set needed to compute TDOA. Within a basic PinPoint message set, the clocks are treated linearly. $\tau_a^z$ and $\tau_b^z$ represent the receive timestamps for the nonparticipant node to be located with TDOA. $\tau^a, \tau_b^a, \tau_a^b$ and $\tau^b$ represent the timestamps for messages between anchor nodes. These are used for computing the clock offset $\theta_{a \to b}(\tau)$ and the $$\frac{\beta_b}{\beta_a}$$

ratio between anchor nodes.

PinPoint TDOA values are computed using the filtered average of TDOA values from the basic message sets. By using many disjoint message sets for TDOA, the nonlinear behavior of $\theta_{a \to b}(\tau)$ is captured. By averaging over these sets, it is assumed that the nonparticipant is stationary for the duration of measurements.

A. Locally Linear Card Model

Within the basic message set illustrated in FIG. 9, three messages are sent: at times $t^a, t^b, t^z$. The first message at time $t^a$ is a beacon from anchor a. The second message at time $t^b$ is a beacon from anchor b. The third message at time $t^z$ is a beacon from the rogue AP.

The send and receive times are modeled using a basic clock model which has been augmented with a send delay s and receive delay r for each card. If timestamping were perfectly executed, then s=r=0. In practice, however, actual card delays are nonzero. While the delay values remain relatively stable for any one card, they tend to vary from card to card. The reference equations with delays in local time are as follows:

$$\tau^a = \beta_a(t^a + \alpha_a) + s_a + e^a \quad (17)$$

$$\tau_b^a = \beta_b(t^a + \alpha_b + d(a,b)) + r_b + e_b^a \quad (18)$$

$$\tau^b = \beta_b(t^b + \alpha_b) + s_b + e^b \quad (19)$$

$$\tau_a^b = \beta_a(t^b + \alpha_a + d(a,b)) + r_a + e_a^b \quad (20)$$

$$\tau_a^z = \beta_a(t^z + \alpha_a + d(a,z)) + r_a + e_a^z \quad (21)$$

$$\tau_b^z = \beta_b(t^z + \alpha_b + d(b,z)) + r_b + e_b^z \quad (22)$$

The card delay terms are in local clock units and not absolute time, so they are not multiplied by β.

B. PinPoint TDOA

The reference equations may be solved for the PinPoint TDOA equation:

$$d(b,z) - d(a,z) = \tau_b^z - \tau_a^z - \underbrace{\frac{1}{2}(\tau^b - \tau_a^b + \tau_b^a - \tau^a)}_{\theta_{a \to b}} - \underbrace{\left(\frac{\beta_b}{\beta_a} - 1\right)\left(\tau_a^z - \frac{1}{2}(\tau_a^b + \tau^a)\right)}_{\theta \text{ drift}} - \underbrace{\frac{1}{2}(r_b - s_b) - \frac{\beta_b}{\beta_a}(r_a - s_a)}_{\text{card delays}} \quad (23)$$

There are three distinct terms of the right side of the equation. The first of these terms is the simple difference of the two receive times, using the clock offset as described in preceding paragraphs relating to Estimation of Offset. The second of these terms corrects for clock drift using the time elapsed between the arrival of $\tau_a^z$ and the average of the second and receive times at node a for the exchange of timing messages. To minimize the effect of clock drift error, messages corresponding to the minimum send times after $\tau_a^z$ and $\tau_b^z$ are looked up for the TDOA computation. The third of these terms corrects for the card delay values.

C. Card Delays

The card delay values are necessary corrections for proper computation of distance in PinPoint TDOA. In the distance computations, the send and receive delays appear together, so that solving for the difference (r–s) is sufficient to characterize the delays. The correction is not a simple offset because it is dependent on the clock drift values, which have been observed to vary.

The (r–s) terms may be solved for when nodes a and b are co-located such that d(b,z)–d(a,z)=d(a,b)=0.

$$r_b - s_b = \tau_b^z - \tau^b + \frac{\beta_b}{\beta_a}(\tau_a^b - \tau_a^z) \quad (24)$$

$$r_a - s_a = \frac{\beta_a}{\beta_b}(-\tau_b^z + \tau_b^a) + \tau_a^z - \tau^a \quad (25)$$

The exact behavior of card delay stability is not yet known; however, startup card delay values appear to be consistent. Also, card delay values appear to be relatively stable over approximately 20 minutes after startup. Thereafter, values may shift, but again appear stable over periods on the order of tens of minutes.

D. Error Estimation

To examine the effect of measurement error of $\tau$, each of the errors, $E_1$, $E_2$, $E_3$ for the three terms in equation 23 are estimated separately. For $E_1$, the standard deviation is computed since the error cannot be bound. For $E_2$ and $E_3$ the absolute error is estimated. The following assumptions in performing this analysis:

1) The receive and send time errors e are independent with mean 0 and standard deviation $\sigma$.
2) Beacons are sent between the anchor nodes at intervals no larger than beacon interval P.
3) Clock drift is stable over short time periods about some value $$\frac{\beta_b}{\beta_a}.$$

$$\left|\frac{\beta_b(t)}{\beta_a(t)} - \frac{\beta_b}{\beta_a}\right| \leq \varepsilon \quad (26)$$

The relative drift rate may fluctuate within this range in any manner.

4) The clock drift estimate $$\frac{\beta_b'}{\beta_a'}$$

is accurate.

$$e_\beta = \left|\frac{\beta_b'}{\beta_a'} - \frac{\beta_b}{\beta_a}\right| < \varepsilon \quad (27)$$

The first term is the addition of random variables. The variance of the error term $E_1$ is the sum of the variances. The standard deviation for $E_1$ therefore equals $\sqrt{3}\sigma$.

For the second term, the absolute error for $E_2$ is estimated. For this term, the clock drift $$\frac{\beta_b}{\beta_a}$$

is more significant than the receive and send time errors. The total error may be bounded in terms of the beacon interval P and the error $\varepsilon$.

The receive and send time errors are negligible. Consequently, clock drift values are <100 ppm so $$\left|\left(\frac{\beta_b}{\beta_a} - 1\right)\right| < 10^{-4}.$$

Any timing errors e will result in distances $$\left|\left(\frac{\beta_b}{\beta_a} - 1\right) * e\right| < 10^{-4}|e|. \text{ If } |e| < 10$$

clock ticks, the errors e will result in total distances $<10^{-4}*e<10^{-3}$ clock ticks, which is negligible for 25 ns clock ticks and expected meter level accuracy.

Next, the error due to clock drift is estimated. Assuming beacons are being sent at a regular common beacon interval P from the anchor nodes, $$\left|\tau_a^z - \frac{1}{2}(\tau_a^b + \tau^a)\right| < P.$$

For PinPoint TDOA then:

$$E_2 = \left(\frac{\beta_b'}{\beta_a'} - \frac{\beta_b}{\beta_a}\right)\left(\tau_a^z - \frac{1}{2}(\tau_a^b + \tau^a)\right) \quad (28)$$

-continued $$|E_2| \leq \left(\left|\frac{\beta_b'}{\beta_a'} - \frac{\beta_b}{\beta_a}\right| + \left|\frac{\beta_b}{\beta_a} - \frac{\beta_b(t)}{\beta_a(t)}\right|\right)P$$

$$|E_2| \leq 2\varepsilon P$$

The error $E_2$ is bounded by $2\varepsilon P$.

The absolute error $E_3$ for the card delay correction term is dependent on the sample size for this estimation. Since the relative clock drift values are very close to one, the standard deviation for error for a single (r–s) measurement is $2\sigma$. By pre-measuring the (r–s) values with large sample sizes, this error may be virtually eliminated. Similar to the analysis for $E_2$, $|E_3| < 2\varepsilon(r_a - s_a)$.

With reasonable assumptions, the expected total error will have a random error component with standard deviation related to $\sigma$ and a bounded error component based on $\varepsilon$. This is summarized in Table I.

TABLE I

Expected Error For PinPoint TDOA

| Process | StdDev | Bias |
|---|---|---|
| PinPoint TDOA | $\sqrt{3}\,\sigma$ | $2 \in [(r_a - s_a) + P]$ |

For a 802.11 based location system, PinPoint TDOA error may be numerically estimated. If clock drift may be measured within 0.1 ppm, then $\varepsilon \leq 1 \cdot 10^{-7}$. In a known madwifi driver, for example, the maximum beacon interval is $P = 10^6$ clock ticks. Assuming $\sigma = 1.6$ clock ticks and $r_a - s_a = 45000$ clock ticks, the total error has standard deviation $2.77\sigma$, with bias les than 0.21 clock ticks.

E. Filtering

Preferably, two general types of filtering mechanisms are employed to eliminate outliers. One type filters timestamps between anchor nodes. The other type filters the final TDOA measurements. The filter for anchor node timestamps accepts values that satisfy the following condition:

$$\left|\frac{\tau_b^a(i) - \tau_b^a(i-1)}{\tau^a(i) - \tau^a(i-1)} - 1\right| < 10^{-4} \tag{29}$$

This is the 802.11 standard specified clock tolerance. Raw TDOA results of equation 23 are filtered using a median-based approach. The median is computed using a partial sort, which runs in expected linear time. Any measurement outside a predetermined hard limit—of say 10 clock ticks, for example—from the median is considered an outlier.

Following filtering, a simple averaging is used to compute the times for TDOA. Using the speed of light, this time average translates to a distance and determines a hyperboloid for use in solving the hyperbolic location problem.

F. Hyperbolic Location Optimization

To solve the hyperbolic location optimization problem defined by the TDOA values, any suitable process known in the art may be used. For example, the conceptually simple gradient descent method may be used.

Distance Measurement Experimental Results

The first experimental setup example illustrated below is designed solely to measure distances. For that reason, the optimization step is not required in this example.

A. Experiment Setup—Distance Only

NETGEAR WG511T and NETGEAR WG511U PC cards with ATHEROS chipsets were used for this experiment on laptop computer platforms running GNU/Linux with the 2.6.22 kernel and the madwifi-ng driver. The wireless card reference clocks were set to run at 40 MHz rather than the standard 1 MHz. Instead of 10 beacons per second, 400 beacons per second were generated. These changes are summarized in Table II.

TABLE II

CLOCK CHARACTERISTICS WITH INCREASED REFERENCE CLOCK SPEED

| Clock speed (MHz) | 1 | 40 |
|---|---|---|
| Clock tick time | 1 µs | 25 ns |
| Beacon interval | 100 ms | 2.5 ms |
| Beacons/sec | 10 | 400 |

Figure 10:
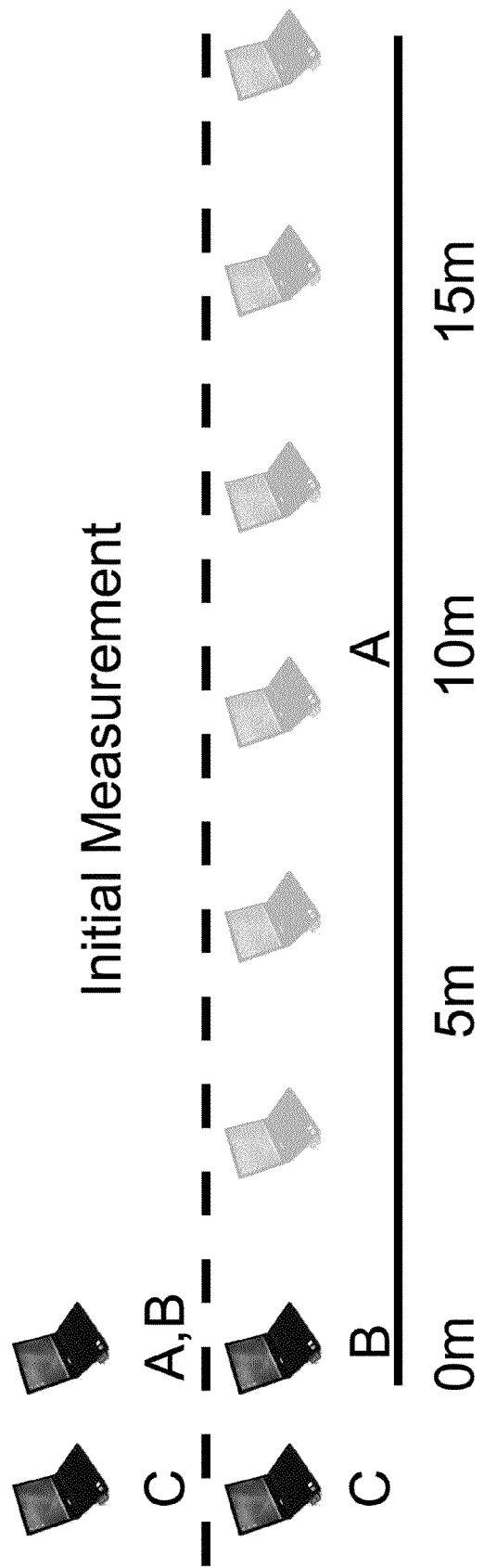
FIG. 10 is a schematic diagram illustrating a sequential relative arrangement of nodes for demonstrating efficacy of a TDOA location system for a wireless communication network implemented in accordance with an exemplary embodiment of the present invention.

As illustrated in FIG. 10, three laptops, each with a single wireless PC Card, were used to verify accurate time distance of arrival measurements. Laptop C operated as an AP, sending beacons only. Beacons sent by C were used to compute TDOA for A and B. Laptops A and B operated as both APs and monitors. The use of AP mode for A and B was for the purpose of sending beacons. Beacons sent by A and B were used to compute the clock offset $\theta(\tau)$ since they contain send times, and are timestamped locally with receive times. The madwifi drivers allowed operation of a single physical card in multiple modes using a mechanism termed virtual access points (VAPs). All laptops were transmitting and receiving on the same channel.

Laptops B and C were left stationary at separate locations. A was moved to seven separate locations, all collinear with B and C. In the linear configuration, the difference of distances is expressed by $d(B, C) - d(A, C) = -d(A, B)$. At each location of A, the timestamps for all received beacons were recorded by B for both A and C and by C for A and B. Measurements were performed for 60-100 seconds at each location.

B. Results

The initial measurement with A and B at distance zero was used to determine the card delay quantities. The card delay quantities are given in Table III. Note that the card delay values are significant. With the measured value $$\frac{\beta_b}{\beta_a} \approx 3.2 * 10^{-6},$$

the correction for the card delay may be represented by $$\frac{1}{2}\left((r_b - s_b) - \frac{\beta_b}{\beta_a}(r_a - s_a)\right) \approx 0.21 \text{ clock ticks.}$$

At 25 ns per clock tick, this equates roughly to 1.57 m.

TABLE III

CARD DELAY VALUES FOR DISTANCE MEASUREMENT

| Card | MAC | r − s |
|---|---|---|
| A | 06:0f:b5:28:2c:65 | 45229.71 |
| B | 06:0f:b5:10:91:5c | 45229.44 |

The TDOA computation gives measurements within 5 m. For this particular experiment, that accuracy is not sufficient to successfully order the distances. Referring to Table IV, for example, the estimated distance value for 12.19 m was larger than that for 15.24 m. The cause of these measurement errors was presumably multipath effects.

TABLE IV

DISTANCE RESULTS

| Distance (m) | Δt Clock Ticks (25 ns) | Estimated (m) | Error (m) |
|---|---|---|---|
| 0.00 | 0 | 0 | N/A |
| 3.05 | 0.16 | 1.19 | −1.86 |
| 6.10 | 0.84 | 6.33 | 0.23 |
| 9.14 | 0.68 | 5.14 | −4.01 |
| 12.19 | 1.45 | 10.84 | −1.35 |
| 15.24 | 1.36 | 10.22 | −5.02 |
| 18.29 | 2.56 | 19.18 | 0.89 |

Figure 11:
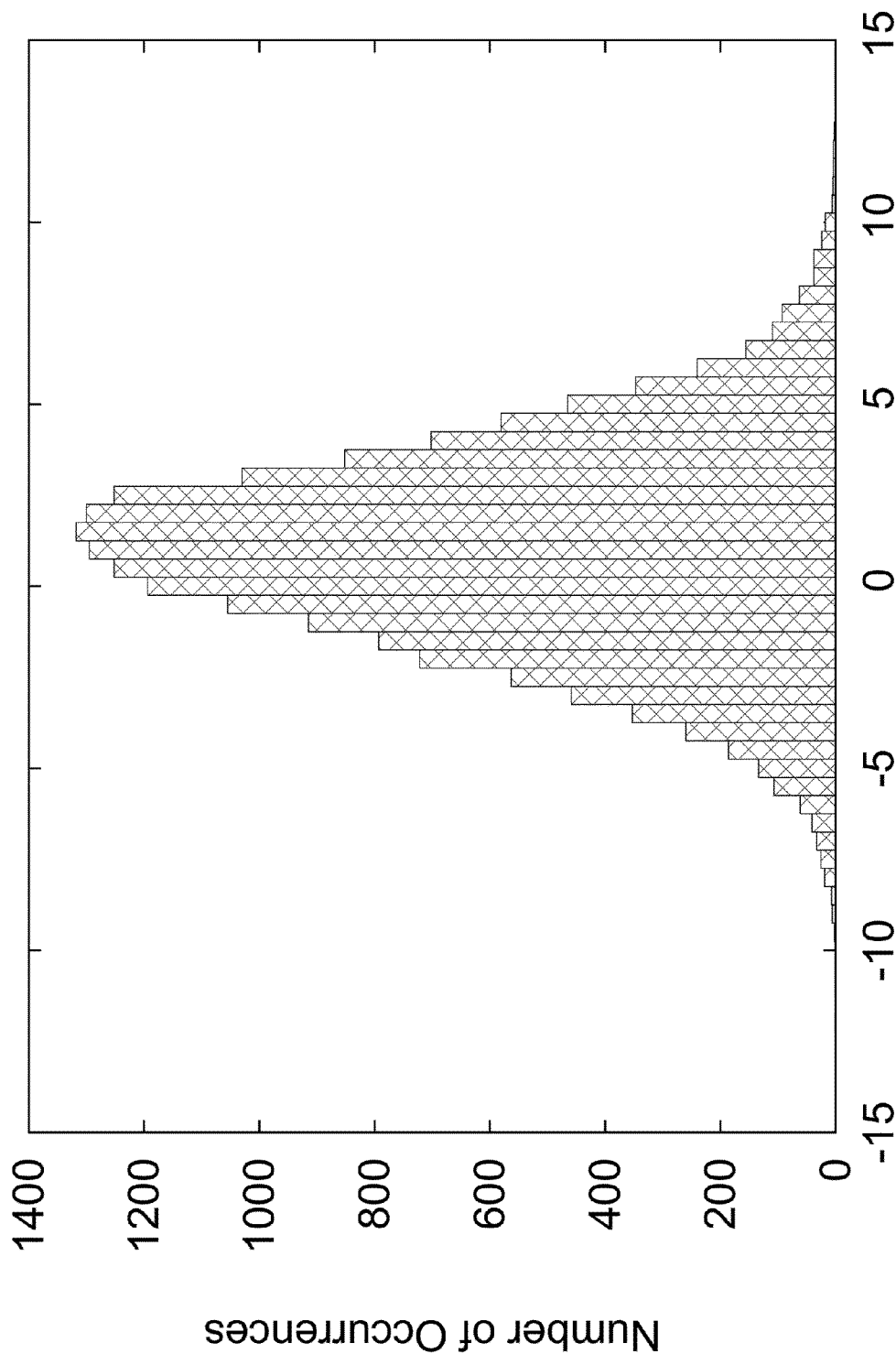
FIG. 11 is a histogram of TDOA values captured in an experimental implementation of a TDOA location system for a wireless communication network in accordance with an exemplary embodiment of the present invention.

A histogram of TDOA values for the 15.24 m case is shown for illustration in FIG. 11. The distribution is unimodal with a mean of 1.370 clock ticks and a median of 1.373 clock ticks. The standard deviation of the distribution is 2.83 clock ticks. This TDOA histogram does not provide an obvious explanation for the distance underestimation.

Figure 12:
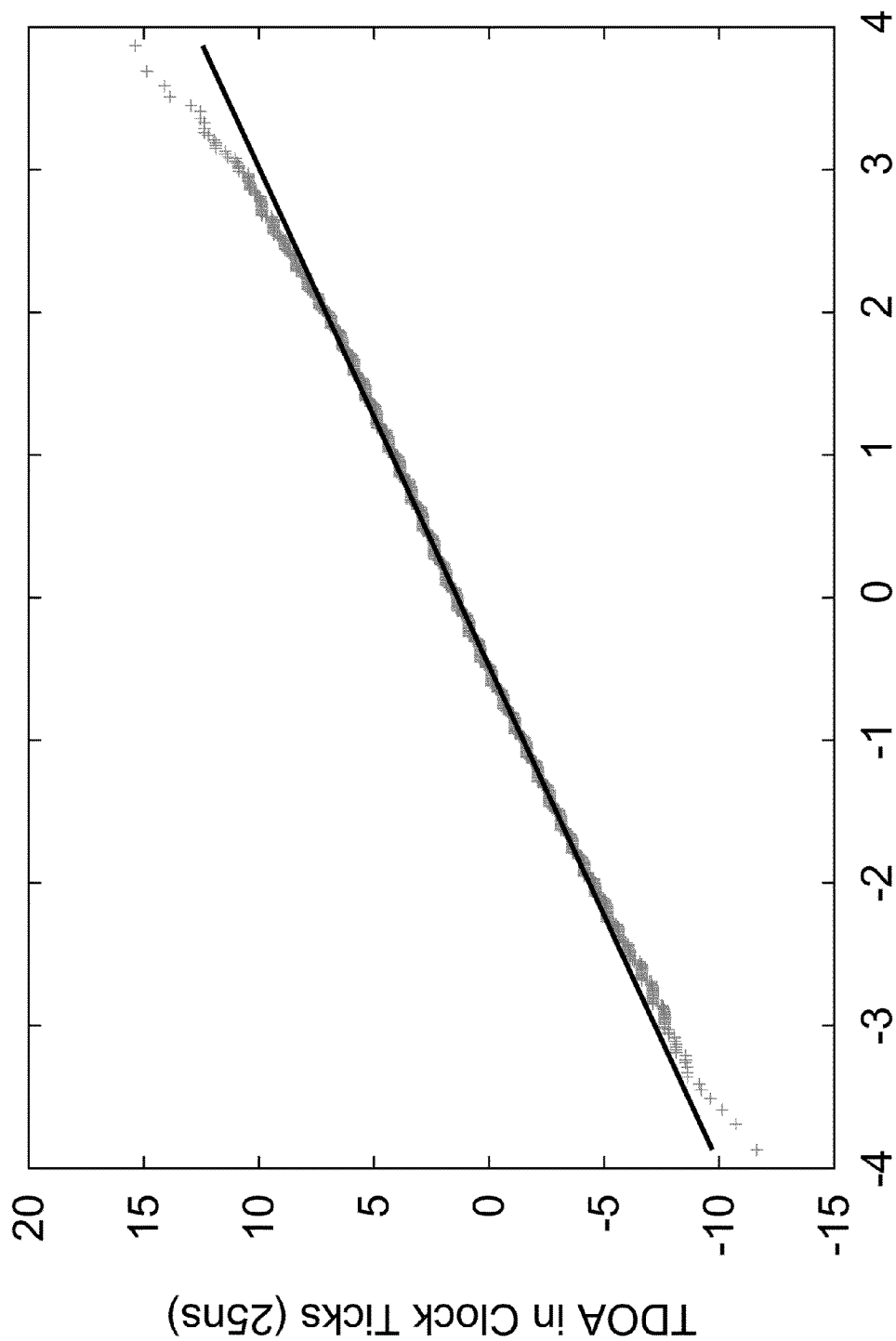
FIG. 12 is a graphic diagram illustrating a statistical distribution of TDOA values captured in an experimental implementation of a TDOA location system for a wireless communication network in accordance with an exemplary embodiment of the present invention.

The Q-Q plot in FIG. 12 shows that the distribution is close to the normal distribution, although with longer tails. The straight line corresponds to the normal distribution. Since a normal distribution would result if clock measurement errors were independent and normal, the distribution's near normality indicates the independence assumption is reasonable. A more detailed model to explain the tail behavior at the extremities of the plot, however, is expected to increase accuracy.

Localization Experimental Results

This experiment demonstrates for the example of a location system implemented with IEEE 802.11 mobile nodes that a mobile node may be located reliably when in line-of-sight position relative to the anchor nodes, with an accuracy of less than approximately 3.5 m. The end-to-end accuracy is determined by comparing the distance between actual locations of the mobile node to those estimated by the subject TDOA location system.

A. Experimental Setup

The test equipment included 2 anchor laptops with UBIQUITI Superrange Cardbus, 1 anchor laptop computer with NETGEAR WG511T, and 1 mobile laptop computer with NETGEAR WG511U. The display laptop computer and each anchor laptop computer were connected to the router via Ethernet.

Each anchor card ran at 40 MHz reference clock speed with maximum beacon interval, sending 40 beacons per second. The 40 MHz value is the maximum known current capability of the ATHEROS based cards.

Figure 13:
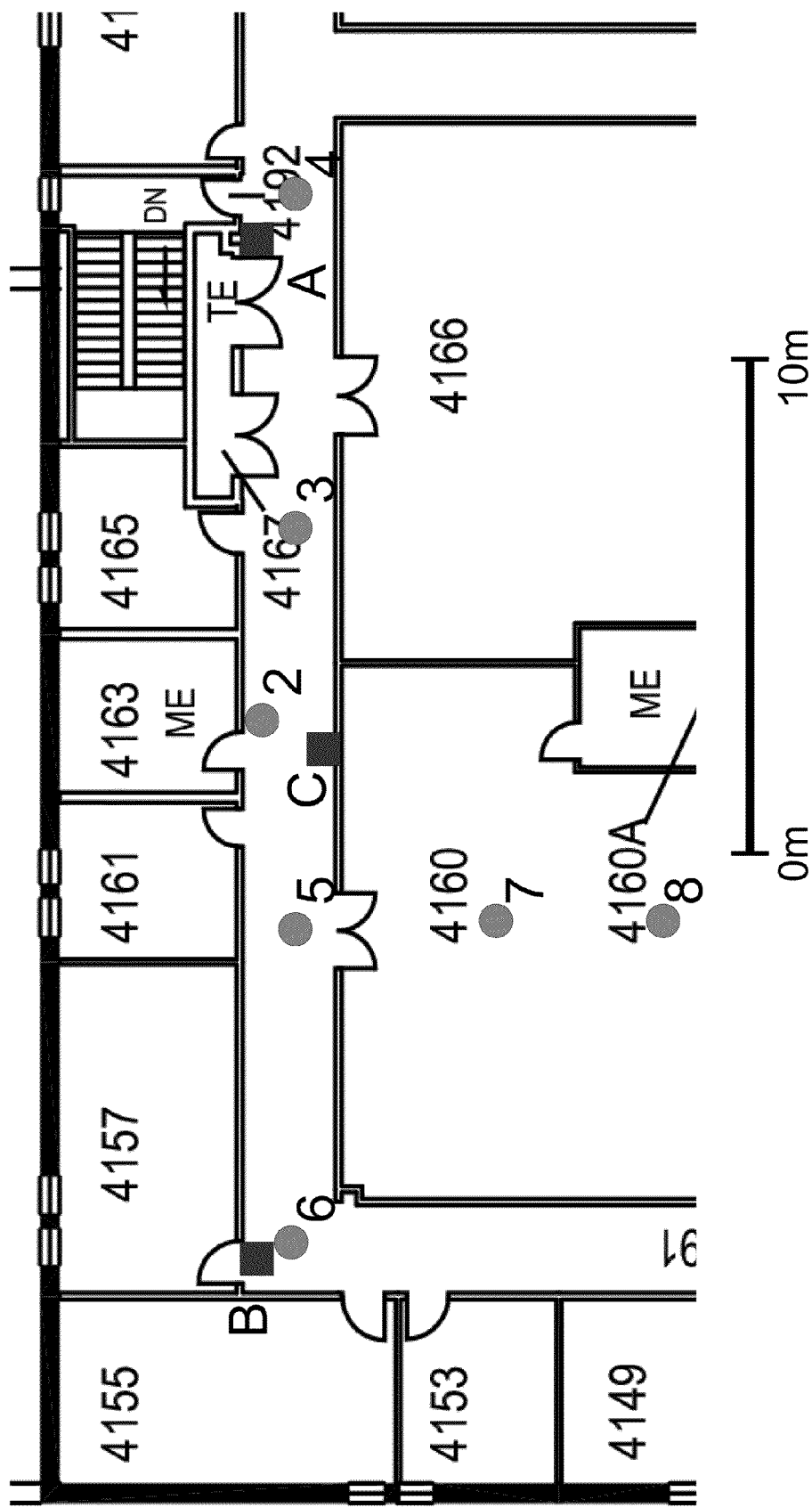
FIG. 13 is a schematic diagram illustrating a first arrangement of nodes in an experimental implementation of a TDOA location system for a wireless communication network in accordance with an exemplary embodiment of the present invention; and, FIG. 14 is a schematic diagram illustrating a second arrangement of nodes in an experimental implementation of a TDOA location system for a wireless communication network in accordance with an exemplary embodiment of the present invention.

After an initial measurement with all anchor nodes at the same location to determine the card delay quantities, all three anchor nodes were placed in a single corridor. The locations of the anchor nodes are shown in FIG. 13. The mobile laptop computer was moved to seven additional locations, also shown in FIG. 13. The mobile laptop was left at each location for approximately 3 minutes, and was oriented so that the wireless PC card maintained line of sight to all anchor nodes.

B. Results

The card delay quantities for this experiment's anchor nodes are given in Table V.

TABLE V

CARD DELAY VALUES FOR 40 MHZ, BEACON INTERVAL 25 MS

| Node | MAC | r − s | Chipset |
|---|---|---|---|
| A | 06:15:6d:54:80:49 | 45230.35 | 5213A |
| B | 06:15:6d:53:f9:61 | 45230.22 | 5213A |
| C | 06:1d:2a:67:84:c9 | −722771.34 | 2414 |

Locations 2 through 8 in Table VI show the actual and estimated mobile locations with location error. Coordinates are in the Qt system, with the origin in the upper left corner, x dimension increasing to the right, and the y dimension increasing downward.

TABLE VI

LOCATION ERROR

| | Actual | | Estimated | | Error |
|---|---|---|---|---|---|
| Location | x (m) | y (m) | x (m) | y(m) | (m) |
| 1 | — | Calibration | | — | — |
| 2 | 24.76 | 9.10 | 26.92 | 10.96 | 2.85 |
| 3 | 28.50 | 9.86 | 29.29 | 11.39 | 1.72 |
| 4 | 34.93 | 9.91 | 37.63 | 9.42 | 2.74 |
| 5 | 20.75 | 9.90 | 19.07 | 11.30 | 2.19 |
| 6 | 14.33 | 9.82 | 11.02 | 9.42 | 3.33 |
| 7 | 20.75 | 14.00 | 19.07 | 11.30 | 3.18 |
| 8 | 20.75 | 17.58 | 21.06 | 10.98 | 6.61 |

Figure 14:
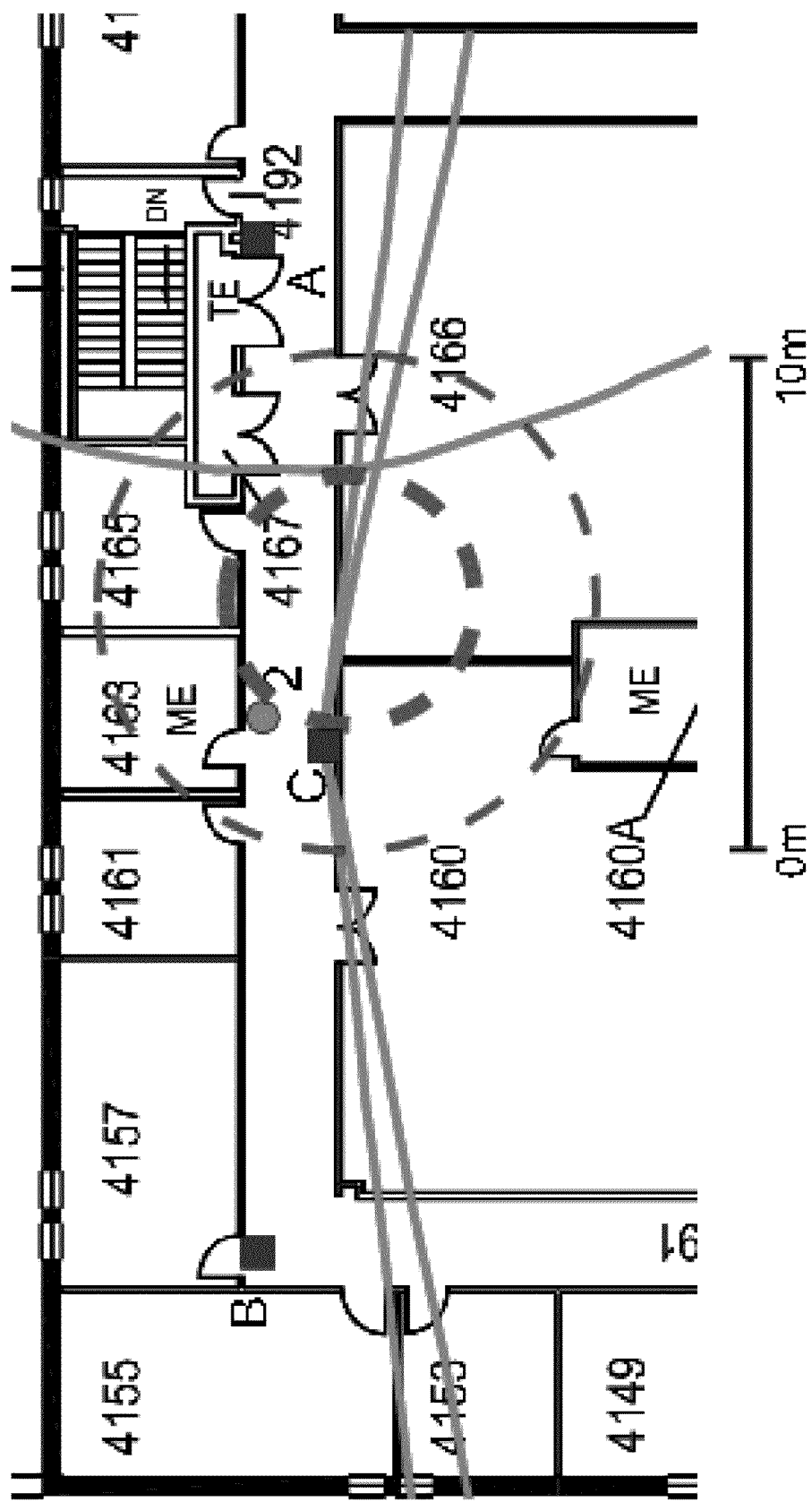

FIG. 14 illustrates the hyperbolas and estimated location of the mobile node for location 2. The anchor nodes are shown with squares. The estimated location is shown using concentric circles with inner radius 2.5 m and outer radius 5 m. In this example, the estimated location is 2.85 m from the actual location.

The arrangement of the anchor nodes in the corridor (of the indoor experiment site diagrammed) provided poor tracking geometry. This is a known limitation of an indoor corridor environment, where nodes cannot be placed with equal angular distribution. In particular, a pair of anchor nodes cannot distinguish between two positions on the same hyperbola using TDOA. For the degenerate hyperbola case, the hyperbola is a line starting at one anchor that extends away from the other anchor. For locations 4 and 6, the initial guess strongly affects the estimated location. For these two locations, the center anchor node was used as the initial guess.

TDOA was effective in locating the mobile node in line-of-sight situations, but not as effective for non-line-of-sight situations. Locations 2-6 are within line-of-sight of the anchor nodes. The error for line-of-sight arrangements was computed to be less than 3.5 m. Locations 7 and 8 are non-line-of-sight. The error for one of the non-line-of-sight measurements was computed to be 3.18 m, while the other was computed to be 6.61 m.

In accordance with certain aspects of the present invention, therefore, TDOA location system based on inexpensive, off-the-shelf 802.11 hardware may be implemented which passively yet accurately locates transmitting nodes. A major difficulty of such inexpensive hardware use—namely, the inaccuracy of local node clocks, and their significant nonlinear behavior even over relatively short periods (for instance, on the order of minutes)—is overcome by the subject method and system. The nonlinear behaviors exhibited by individual local clocks are corrected to measure TDOA using a model that combine clock offset and locally linear behavior around measurements of the clock offset. Based on such corrections, the TDOA location system disclosed herein has demonstrated accuracies of approximately 3 m in simple line-of-sight environments.

The TDOA location system requires anchor nodes to have the capability of timestamping sent and received messages, but need not make any assumptions about the communication protocol. For this reason, the system may be used for any communication protocol so long as the requisite timestamps are available.

Moreover, the subject TDOA location system provides the capability to locate transmitting nonparticipants. This allows implementation of location capabilities without control over existing network nodes.

Application of the present invention to even more complex operating environments than those in the exemplary embodiments illustrated herein is contemplated in various alternate embodiments. In certain applications, for example, complex multipath effects may be encountered. In certain others, for example, both TOA and TDOA information may need to be combined to optimize location finding.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A method for adaptive synchronization of timing information provided in communications messages transmitted between independently clocked communication nodes operating in a wireless communications network comprising the steps of:
   collecting timestamps for messages generated by a plurality of the nodes, each said timestamp being generated by one of the nodes relative to a local time reference thereof;
   computing a pairwise clock error for at least one pair of nodes based upon a plurality of network messages passed therebetween;
   adaptively establishing a global time reference for said timestamps responsive to said pairwise clock error;
   defining a plurality of mapping factors each for translating from one said local time reference to said global time reference; and
   selectively applying said mapping factors to corresponding ones of said timestamps for adaptive synchronization thereof,
   wherein said pairwise clock error includes clock drift and clock offset components, each determined based on a ratio of local clock rates for paired nodes of said at least one pair of nodes, and
   wherein a plurality of timestamped message rounds are collected for said paired nodes, said pairwise clock error being computed to adaptively define between successive rounds of timestamped messages a piecewise linearity in the variation of clock offset modeled between said paired nodes.

2. A system for adaptive synchronization of timing information provided in communications messages transmitted between independently clocked communication nodes operating in a wireless communications network comprising:
   a plurality of event timestampers for timestamping messages generated by a plurality of the nodes, each said timestamp being generated by one of the nodes relative to a local time reference thereof; and
   a programmably configured synchronizer operable to:
      compute a pairwise clock error for at least one pair of nodes based upon a plurality of network messages passed therebetween;
      adaptively establish a global time reference for said timestamps responsive to said pairwise clock error;
      define a plurality of mapping factors each for translating from one said local time reference to said global time reference; and
      selectively apply said mapping factors to corresponding ones of said timestamps for adaptive synchronization thereof,
   wherein said synchronizer is configured to compute for said pairwise clock error clock drift and clock offset components, each determined based on a ratio of local clock rates for said paired nodes, and to compute said pairwise clock error to adaptively define between successive rounds of timestamped messages a piecewise linearity in the variation of clock offset modeled between said paired nodes.

3. The method as recited in claim 1, wherein said piecewise linearity between successive rounds of timestamped messages for said paired nodes is defined by a slope proportional to said ratio of local clock rates therefor.

4. The method as recited in claim 1, wherein said global time reference is established for a network graph formed by at least three nodes, a plurality of said pairwise clock errors being computed respectively for selective pairings of said nodes, a global clock rate being determined substantially as an average of said pairwise clock drift components for said paired nodes.

5. The method as recited in claim 4, wherein said global clock rate is computed based on said pairwise clock drift components for said nodes according to:

$$\beta_* = \frac{1}{|\Omega|} \sum_{\omega \in \Omega} \beta_\omega$$

where $\beta_*$ represents said global clock rate; $\beta_\omega$ represents said local clock rate for each said node $\omega$; and, $|\Omega|$ represents the number of said nodes in said network graph.

6. The method as recited in claim 5, wherein:
(a) a global clock drift $$\frac{\beta_*}{\beta_\omega}$$

and a global clock offset $\theta_{\omega \to *}$ are iteratively computed for each said node $\omega$ based on pairwise clock drift ratios $$\frac{\beta_b}{\beta_a}, \frac{\beta_c}{\beta_a},$$

... and said pairwise clock offset components $\theta_{a \to b}$, $\theta_{a \to c}$, ... for paired ones of all said nodes (a, b, c, ... );

where $\beta_a, \beta_b, \beta_c, \ldots$ represent local clock rates respectively at said nodes (a, b, c, ...); and, (b) a local time measure $\tau_a$ relative to said local time reference at a node a of said network graph is translated to a corresponding global virtual time measure $\tau_*$ relative to said global time reference according to:

$$\tau_* = f_a(\tau_a)$$
$$= \frac{\beta_*}{\beta_a}\tau_a + \theta_{a \to *}$$

where $f_a$ represents said mapping factor for node a.

7. The method as recited in claim 6, wherein:

(a) said network graph is fully connected, and said global clock drift is determined according to a matrix (A) defined by:

$$A = \frac{1}{|\Omega|}\begin{bmatrix} 1 & \frac{\beta_b}{\beta_a} & \frac{\beta_c}{\beta_a} & \cdots \\ \frac{\beta_a}{\beta_b} & 1 & \frac{\beta_b}{\beta_c} & \cdots \\ \frac{\beta_a}{\beta_c} & \frac{\beta_b}{\beta_c} & 1 & \cdots \\ \vdots & \vdots & \vdots & \ddots \end{bmatrix}$$

(b) a translation from each of said local time references to said global time reference is based on an eigenvector x for a greatest eigenvalue ($\lambda=1$) of said matrix (A), entries of said eigenvector x being defined as follows:

$$x = \begin{bmatrix} \frac{\beta_*}{\beta_a} \\ \frac{\beta_*}{\beta_b} \\ \frac{\beta_*}{\beta_c} \\ \vdots \end{bmatrix}$$

8. The method as recited in claim 6, wherein:

(a) said network graph is less than fully connected, and said global clock drift is determined according to a matrix (A) defined by:

$$k_{\omega 1, \omega 2} = \begin{cases} 0 & \text{if } (\omega_1, \omega_2) \notin E \\ \frac{\beta_{\omega_2}}{\beta_{\omega_1}} & \text{if } (\omega_1, \omega_2) \in E \end{cases}$$

$$A = \begin{bmatrix} \frac{1}{|\Omega_a|} & \frac{k_{b,a}}{|\Omega_a|} & \frac{k_{c,a}}{|\Omega_a|} & \cdots \\ \frac{k_{a,b}}{|\Omega_b|} & \frac{1}{|\Omega_b|} & \frac{k_{c,b}}{|\Omega_b|} & \cdots \\ \frac{k_{a,c}}{|\Omega_c|} & \frac{k_{b,c}}{|\Omega_c|} & \frac{1}{|\Omega_c|} & \cdots \\ \vdots & \vdots & \vdots & \ddots \end{bmatrix}$$

where $k_{\omega 1, \omega 2}$ represents an edge factor indicative of whether nodes $\omega 1$ and $\omega 2$ define an edge of said network graph therebetween;

(b) each row of said matrix (A) corresponds to relative clock drifts involving one node $\omega$, and $|\Omega_\omega|$ represents the number of non-zero entries for each said row; and, (c) a translation from each of said local time references to said global time reference is based on an eigenvector x for a greatest eigenvalue ($\lambda=1$) of said matrix (A), entries of said eigenvector x being defined as follows:

$$x = \begin{bmatrix} \frac{\beta_*}{\beta_a} \\ \frac{\beta_*}{\beta_b} \\ \frac{\beta_*}{\beta_c} \\ \vdots \end{bmatrix}$$

9. The method as recited in claim 8, wherein said eigenvector x entry of each said node of said network graph is iteratively computed to convergence thereat, said iterative computing being based on locally available ones of said pairwise clock drift ratios; wherein:

(a) each said node a maintains $$\frac{\beta_*}{\beta_\omega} = 1$$

for an initial state i=0; said eigenvector x entries for subsequent states i+1 of node a being computed according to:

$$\frac{\beta_*}{\beta_a}(i+1) = \frac{1}{|\Omega_a|}\sum_{\omega \in \Omega_a}\left[(k_{\omega,a}) * \frac{\beta_*}{\beta_\omega}(i)\right]$$

$$\lim_{n \to \infty}\frac{\beta_*}{\beta_{a(n)}} = \frac{\beta_*}{\beta_a} \text{ and,}$$

(b) each said node a transmits said global clock drift value $$\frac{\beta_*}{\beta_a}$$

thereof for each iteration to neighboring ones of said nodes, whereby said neighboring nodes are responsively updated in state.

10. The method as recited in claim 6, wherein said network graph is fully connected, and wherein:

(a) said pairwise clock offset component relative to each said pairing of nodes a, b is computed according to:

$$\theta_{a \to b} = \frac{1}{2}\left[\frac{\beta_*}{\beta_b}((\tau^b + \tau_b^a) - (s_b + r_b)) - \frac{\beta_*}{\beta_a}((\tau^a + \tau_a^b) - (s_a + r_a))\right]$$
$$= \beta_*(\alpha_b - \alpha_a)$$

where said global clock drift rates $$\frac{\beta_*}{\beta_a}, \frac{\beta_*}{\beta_b}$$

at said nodes a, b are substantially equal; and,
where $\alpha_a$ and $\alpha_b$ represent characteristic local clock start time parameters at said nodes a, b; $s_a$ and $s_b$ represent characteristic hardware send delays at said nodes a, b; and, $r_a$, $r_b$ represent characteristic hardware receive delays at said nodes a, b; and, (b) said global clock offset $\theta_{a \to *}$ at each said node a is computed with respect to every other of said nodes $\omega$ according to:

$$\theta_{a \to *} = \frac{\beta_*}{|\Omega|} \sum_{\omega \in \Omega} (\alpha_\omega - \alpha_a)$$

$$= \frac{1}{|\Omega|} \sum_{\omega \in \Omega} (\theta_{a \to \omega})$$

11. The method as recited in claim 6, wherein said network graph is less than fully connected, and wherein:

(a) said global clock offset $\theta_{a \to *}$ at each said node a is initialized to zero as follows:

$$\forall \omega \in \Omega, \theta_{\omega \to *}(0) = 0$$

(b) said global clock offset $\theta_{\omega \to *}$ at each said node a is iteratively computed thereafter respect to at least a neighboring one of said nodes $\omega$ in said network graph according to:

$$\theta_{a \to *}(n+1) = \frac{1}{|\Omega_a|} \sum_{\omega \in \Omega_a} (\theta_{a \to \omega} + \theta_{\omega \to *}(n))$$

where $\theta_{a \to \omega}$ represents said pairwise clock offset component at node a relative to said neighboring one of said nodes $\omega$, and $\theta_{\omega \to *}(n)$ represents said pairwise clock offset at said neighboring node relative to another of said nodes k within said network graph for a preceding state n;

(c) each said node a transmits said global clock offset $\theta_{a \to *}$ value for each iteration to each said neighboring node thereof, whereby each said neighboring node is responsively updated in state; and, (d) said global clock offset $\theta_{a \to *}$ converges in value as follows:

$$\lim_{n \to \infty} \theta_{a \to *}(n) = \theta_{a \to *} + \phi$$

where $\phi$ is a constant factor applicable to all said nodes of said network graph, and is determined based upon said characteristic $\alpha$ values of said nodes and neighborhood sizes thereof.

12. The method as recited in claim 1, further comprising generating a plurality of time-based distance measurements between pairs of said nodes based on at least a portion of said adaptively synchronized timestamps; and, location processing said time-based distance measurements according to a predetermined location protocol for locating a first of said nodes in position relative to at least a second of said nodes disposed at a known position.

13. The method as recited in claim 12, wherein at least a third said node is established as a participating node configured according to said predetermined location protocol, said first node being located responsive to said location processing of at least one said time-based measurement between each pairing of said first, second, and third nodes.

14. The method as recited in claim 13, wherein said location processing protocol is a pinpoint time difference of arrival (TDOA) protocol.

15. The system as recited in claim 2, wherein
said piecewise linearity between successive rounds of timestamped messages for said paired nodes is defined by a slope proportional to said ratio of local clock rates therefor.

16. The system as recited in claim 15, wherein said global time reference is established for a network graph formed by at least three nodes, a plurality of said pairwise clock errors being computed respectively for selective pairings of said nodes, a global clock rate being determined substantially as an average of said pairwise clock drift components for said paired nodes.

17. The system as recited in claim 16, wherein:
(a) said global clock rate is computed based on said pairwise clock drift components for said nodes according to:

$$\beta_* = \frac{1}{|\Omega|} \sum_{\omega \in \Omega} \beta_\omega$$

where $\beta_*$ represents said global clock rate; $\beta_\omega$ represents said local clock rate for each said node $\omega$; and, $|\Omega|$ represents the number of said nodes in said network graph;

(b) a global clock drift $$\frac{\beta_*}{\beta_\omega}$$

and a global clock offset $\theta_{\omega \to *}$ are iteratively computed for each said node $\omega$ based on pairwise clock drift ratios $$\frac{\beta_b}{\beta_a}, \frac{\beta_c}{\beta_a}, \ldots$$

... and said pairwise clock offset components $\theta_{a \to b}$, $\theta_{a \to c}$, ... for paired ones of all said nodes (a, b, c, ...); where $\beta_a$, $\beta_b$, $\beta_c$, ... represent local clock rates respectively at said nodes (a, b, c, ...); and, (c) a local time measure $\tau_a$ relative to said local time reference at a node a of said network graph is translated to a corresponding global virtual time measure $\tau_*$ relative to said global time reference according to:

$$\tau_* = f_a(\tau_a)$$

$$= \frac{\beta_*}{\beta_a} \tau_a + \theta_{a \to *}$$

where $f_a$ represents said mapping factor for node a.

18. The system as recited in claim 17, wherein:
(a) said network graph is fully connected, and said global clock drift is determined according to a matrix (A) defined by:

$$A = \frac{1}{|\Omega|} \begin{bmatrix} 1 & \frac{\beta_b}{\beta_a} & \frac{\beta_c}{\beta_a} & \cdots \\ \frac{\beta_a}{\beta_b} & 1 & \frac{\beta_b}{\beta_c} & \cdots \\ \frac{\beta_a}{\beta_c} & \frac{\beta_b}{\beta_c} & 1 & \cdots \\ \vdots & \vdots & \vdots & \ddots \end{bmatrix}$$

(b) a translation from each of said local time references to said global time reference is based on an eigenvector x for a greatest eigenvalue ($\lambda$=1) of said matrix (A), entries of said eigenvector x being defined as follows:

$$x = \begin{bmatrix} \frac{\beta_*}{\beta_a} \\ \frac{\beta_*}{\beta_b} \\ \frac{\beta_*}{\beta_c} \\ \vdots \end{bmatrix}$$

19. The system as recited in claim 17, wherein:
(a) said network graph is less than fully connected, and said global clock drift is determined according to a matrix (A) defined by:

$$k_{\omega 1, \omega 2} = \begin{cases} 0 & \text{if } (\omega_1, \omega_2) \notin E \\ \frac{\beta_{\omega 2}}{\beta_{\omega 1}} & \text{if } (\omega_1, \omega_2) \in E \end{cases}$$

$$A = \begin{bmatrix} \frac{1}{|\Omega_a|} & \frac{k_{b,a}}{|\Omega_a|} & \frac{k_{c,a}}{|\Omega_a|} & \cdots \\ \frac{k_{a,b}}{|\Omega_b|} & \frac{1}{|\Omega_b|} & \frac{k_{c,b}}{|\Omega_b|} & \cdots \\ \frac{k_{a,c}}{|\Omega_c|} & \frac{k_{b,c}}{|\Omega_c|} & \frac{1}{|\Omega_c|} & \cdots \\ \vdots & \vdots & \vdots & \ddots \end{bmatrix}$$

where $k_{\omega 1, \omega 2}$ represents an edge factor indicative of whether nodes $\omega 1$ and $\omega 2$ define an edge of said network graph therebetween;
(b) each row of said matrix (A) corresponds to relative clock drifts involving one node $\omega$, and $|\Omega_\omega|$ represents the number of non-zero entries for each said row; and,
(c) a translation from each of said local time references to said global time reference is based on an eigenvector x for a greatest eigenvalue ($\lambda$=1) of said matrix (A), entries of said eigenvector x being defined as follows:

$$x = \begin{bmatrix} \frac{\beta_*}{\beta_a} \\ \frac{\beta_*}{\beta_b} \\ \frac{\beta_*}{\beta_c} \\ \vdots \end{bmatrix}$$

20. The system as recited in claim 19, wherein said eigenvector x entry of each said node of said network graph is iteratively computed to convergence thereat, said iterative computation for each said node being based on locally available ones of said pairwise clock drift ratios, wherein:
(a) each said node a maintains $$\frac{\beta_*}{\beta_\omega} = 1$$

for an initial state i=0; said eigenvector x entries for subsequent states i+1 of node a being computed according to:

$$\frac{\beta_*}{\beta_a}(i+1) = \frac{1}{|\Omega_a|} \sum_{\omega \in \Omega_a} \left[ (k_{\omega,a}) * \frac{\beta_*}{\beta_\omega}(i) \right]$$

$$\lim_{n \to \infty} \frac{\beta_*}{\beta_{a(n)}} = \frac{\beta_*}{\beta_a} \text{ and,}$$

(b) each said node a transmits said global clock drift value $$\frac{\beta_*}{\beta_a}$$

thereof for each iteration to neighboring ones of said nodes, whereby said neighboring nodes are responsively updated in state.

21. The system as recited in claim 17, wherein said network graph is fully connected, and wherein:
(a) said pairwise clock offset component relative to each said pairing of nodes a, b is computed according to:

$$\theta_{a \to b} = \frac{1}{2} \Big[ \frac{\beta_*}{\beta_b}((\tau^b + \tau_b^a) - (s_b + r_b)) - \frac{\beta_*}{\beta_a}((\tau^a + \tau_a^b) - (s_a + r_a)) \Big]$$

$$= \beta_*(\alpha_b - \alpha_a)$$

where said global clock drift rates $$\frac{\beta_*}{\beta_a}, \frac{\beta_*}{\beta_b}$$

at said nodes a, b are substantially equal; and,
where $\alpha_a$ and $\alpha_b$ represent characteristic local clock start time parameters at said nodes a, b; $s_a$ and $s_b$ represent characteristic hardware send delays at said nodes a, b; and, $r_a$, $r_b$ represent characteristic hardware receive delays at said nodes a, b; and,
(b) said global clock offset $\theta_{a \to *}$ at each said node a is computed with respect to every other of said nodes $\omega$ according to:

$$\theta_{a \to *} = \frac{\beta_*}{|\Omega|} \sum_{\omega \in \Omega} (\alpha_\omega - \alpha_a)$$

$$= \frac{1}{|\Omega|} \sum_{\omega \in \Omega} (\theta_{a \to \omega})$$

22. The system as recited in claim 17, wherein said network graph is less than fully connected, and wherein:

(a) said global clock offset $\theta_{a \to *}$ at each said node a is initialized to zero as follows:

$$\forall \omega \in \Omega, \theta_{\omega \to *}(0) = 0$$

(b) said global clock offset $\theta_{\omega \to *}$ at each said node a is iteratively computed thereafter respect to at least a neighboring one of said nodes ω in said network graph according to:

$$\theta_{a \to *}(n+1) = \frac{1}{|\Omega_a|} \sum_{\omega \in \Omega_a} (\theta_{a \to \omega} + \theta_{\omega \to *}(n))$$

where $\theta_{a \to \omega}$ represents said pairwise clock offset component at node a relative to said neighboring one of said nodes ω, and $\theta_{\omega \to *}(n)$ represents said pairwise clock offset at said neighboring node relative to another of said nodes k within said network graph for a preceding state n;

(c) each said node a transmits said global clock offset $\theta_{a \to *}$ value for each iteration to each said neighboring node thereof, whereby each said neighboring node is responsively updated in state; and, (d) said global clock offset $\theta_{a \to *}$ converges in value as follows:

$$\lim_{n \to \infty} \theta_{a \to *}(n) = \theta_{a \to *} + \phi$$

where φ is a constant factor applicable to all said nodes of said network graph, and is determined based upon said characteristic α values of said nodes and neighborhood sizes thereof.

23. The system as recited in claim 16, further comprising a location unit coupled to said synchronizer programmably configured to generate a plurality of time-based distance measurements between pairs of said nodes based on at least a portion of said adaptively synchronized timestamps; said location unit location processing said time-based distance measurements according to a predetermined location protocol for locating a first of said nodes in position relative to at least a second of said nodes configured according to said predetermined location protocol as an anchor node having a known position.

24. The system as recited in claim 23, wherein at least a third said node is established as a participating node configured according to said predetermined location protocol, said location unit determining a position of said first node responsive to said location processing of at least one said time-based measurement between each pairing of said first, second, and third nodes.

25. The system as recited in claim 24, wherein said location processing protocol is a pinpoint time difference of arrival (TDOA) protocol.

26. A time-based location system for locating in position independently clocked communication nodes operating in a wireless communications network, comprising:
at least one anchor node configured according to a predetermined location protocol, said anchor node having a known position;
at least one participating node configured according to said predetermined location protocol;
a plurality of event timestampers for timestamping messages generated by the plurality of communication nodes, each said timestamp being generated by one of said nodes relative to a local time reference thereof;
a programmably configured synchronizer adaptively synchronizing timing information provided in communications messages transmitted between said nodes operable to:
compute a pairwise clock error for at least one pair of nodes based upon a plurality of network messages passed therebetween;
adaptively establish a global time reference for said timestamps responsive to said pairwise clock error;
define a plurality of mapping factors each for translating from one said local time reference to said global time reference; and,
selectively apply said mapping factors to corresponding ones of said timestamps for adaptive synchronization thereof; and,
a location unit coupled to said synchronizer, said location unit being programmably configured to locate a node in position responsive to a plurality of time-based distance measurements generated between pairs of said nodes based on at least a portion of said adaptively synchronized timestamps.

27. The system as recited in claim 26, wherein said location unit is configured to generate said time-based distance measurements according to a pinpoint time difference of arrival (TDOA) location protocol, said location unit being operable to thereby locate a non-participating node of unknown position, said location unit including:
a distance processor programmably configured to generate TDOA difference of distance values for said node, anchor node, and participating node paired one with each of the others; and,
an optimizer coupled to said distance processor and programmably configured for executing a hyperbolic location optimization for said nodes based on said time-based distance measurements and TDOA difference of distance values therefor.

28. The system as recited in claim 27, therein;
(a) timing information is referenced according to:

$$\tau^a = \beta_a(t^a + \alpha_a) + s_a + e^a$$

$$\tau_b^a = \beta_b(t^a + \alpha_b + d(a,b)) + r_b + e_b^a$$

$$\tau^b = \beta_b(t^b + \alpha_b) + s_b + e^b$$

$$\tau_a^b = \beta_a(t^b + \alpha_a + d(a,b)) + r_a + e_a^b$$

$$\tau_a^z = \beta_a(t^z + \alpha_a + d(a,z)) + r_a + e_a^z$$

$$\tau_b^z = \beta_b(t^z + \alpha_b + d(b,z)) + r_b + e_b^z$$

where $\tau^a$, $\tau^b$ represent local times measured at nodes a and b; $\tau_b^a$, $\tau_a^b$, $\tau_a^z$, $\tau_b^z$ represent local receive times measured at nodes b, a, a, b sent by nodes a, b, z, z respectively; $\beta_a$, $\beta_b$ represent local clock rates respectively at nodes a, b; $\alpha_a$, $\alpha_b$ represent independent local clock start time factors at nodes a, b; $r_a$, $r_b$ represent characteristic hardware receive time delays at nodes a, b; $s_a$, $s_b$ represent characteristic hardware send time delays at nodes a, b; $e_b^a$, $e_a^b$, $e_a^z$, $e_b^z$ represent timing errors for messages received at nodes b, a, a, b sent by nodes a, b, z, z respectively; and, $t^a$, $t^b$, $t^z$ represent absolute send times of messages from nodes a, b, z;

(b) said TDOA difference of distance values are generated according to:

$$d(b, z) - d(a, z) = \tau_b^z - \tau_a^z - \frac{1}{2}(\tau^b - \tau_a^b + \tau_b^a - \tau^a) - \left(\frac{\beta_b}{\beta_a} - 1\right)\left(\tau_b^z - \frac{1}{2}(\tau_a^b + \tau^a)\right) - \frac{1}{2}(r_b - s_b) - \frac{\beta_b}{\beta_a}(r_a - s_a)$$

where $\frac{\beta_b}{\beta_a}$ represents a pairwise clock drift ratio for nodes $a$ and $b$;

whereby said TDOA difference of distance values are adjusted in adaptively synchronized manner for clock offset and clock drift components of pairwise clock error between said nodes and for characteristic and send receive delays of said nodes.

29. The system as recited in claim 28, wherein each of said nodes includes an IEEE 802.11 type wireless card operating to establish said local time reference therefor.

* * * * *